(12) United States Patent
Kakinuma

(10) Patent No.: US 12,441,821 B2
(45) Date of Patent: Oct. 14, 2025

(54) (METH)ACRYLATE AND USE THEREOF

(71) Applicant: MITSUI CHEMICALS, INC., Tokyo (JP)

(72) Inventor: Naoyuki Kakinuma, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 1249 days.

(21) Appl. No.: 16/759,791

(22) PCT Filed: Nov. 27, 2018

(86) PCT No.: PCT/JP2018/043467
§ 371 (c)(1),
(2) Date: Apr. 28, 2020

(87) PCT Pub. No.: WO2019/107323
PCT Pub. Date: Jun. 6, 2019

(65) Prior Publication Data
US 2021/0179745 A1    Jun. 17, 2021

(30) Foreign Application Priority Data

Nov. 28, 2017 (JP) ................................ 2017-227837
Nov. 28, 2017 (JP) ................................ 2017-227839

(51) Int. Cl.
C08F 20/38 (2006.01)
A61K 6/893 (2020.01)
(Continued)

(52) U.S. Cl.
CPC .............. *C08F 20/38* (2013.01); *A61K 6/893* (2020.01); *C08F 22/24* (2013.01); *C08G 18/677* (2013.01);
(Continued)

(58) Field of Classification Search
CPC .......... C08F 20/38; C08F 22/24; C08F 28/02; C08F 122/22; C08F 120/38; C08F 128/02;
(Continued)

(56) References Cited

U.S. PATENT DOCUMENTS 3,600,359 A  *  8/1971  Miranda ............. C08G 18/672
                                                       558/240
5,578,658 A     11/1996 Sasagawa et al.
(Continued)

FOREIGN PATENT DOCUMENTS

CN       1106841 A     8/1995
CN     108503794 A  *  9/2018  ......... C08G 18/3876
(Continued)

OTHER PUBLICATIONS

Quan et al., "Ultraviolet Curing of Liquiud Polysulfide Thiourethane Acrylate," Journal of Applied Polymer Science, (2004), vol. 91, No. 4, pp. 2358-2363.
(Continued)

*Primary Examiner* — Randy P Gulakowski
*Assistant Examiner* — David L Miller
(74) *Attorney, Agent, or Firm* — BUCHANAN INGERSOLL & ROONEY PC

(57) ABSTRACT

It is an object of the present invention to provide a monomer which can provide a cured product having both high toughness and rigidity. The present invention is a (meth)acrylate (D) which is a reaction product of a thiol compound (A) having two or more mercapto groups; an iso(thio)cyanate compound (B) having two or more iso(thio)cyanato groups; and a hydroxy (meth)acrylate compound (C) having one or more polymerizable groups.

12 Claims, 11 Drawing Sheets

(51) Int. Cl.
*C08F 22/24* (2006.01)
*C08F 120/38* (2006.01)
*C08F 220/38* (2006.01)
*C08G 18/67* (2006.01)
*C08L 75/16* (2006.01)
C08F 28/02 (2006.01)
C08F 122/24 (2006.01)
C08F 222/24 (2006.01)
C08L 33/14 (2006.01)
C08L 75/14 (2006.01)

(52) U.S. Cl.
CPC .............. *C08L 75/16* (2013.01); *C08F 28/02* (2013.01); *C08F 120/38* (2013.01); *C08F 122/24* (2013.01); *C08F 220/387* (2020.02); *C08F 222/245* (2020.02); *C08L 33/14* (2013.01); *C08L 75/14* (2013.01)

(58) Field of Classification Search
CPC .......................... C08F 220/38; C08F 220/382; C08F 220/385; C08F 220/387; C08F 222/24; C08F 222/245; C08F 228/08; C08F 228/04; A61K 6/893; C08G 18/677; C08L 33/14; C08L 41/00; C08L 75/14; C08L 75/16
See application file for complete search history.

(56) References Cited

U.S. PATENT DOCUMENTS

| | | | |
|---|---|---|---|
| 5,876,210 A * | 3/1999 | Klee | .................... C08G 18/835 523/105 |
| 6,653,375 B2 | 11/2003 | Moszner et al. | |
| 8,455,566 B2 | 6/2013 | Anton et al. | |
| 9,011,150 B2 | 4/2015 | Sun | |
| 9,511,004 B2 | 12/2016 | Naruse et al. | |
| 9,937,105 B2 | 4/2018 | Sun | |
| 2002/0082315 A1 | 6/2002 | Moszner et al. | |
| 2012/0129973 A1 | 5/2012 | Sun | |
| 2012/0296003 A1 | 11/2012 | Naruse et al. | |
| 2015/0196462 A1 | 7/2015 | Sun | |
| 2019/0023918 A1 | 1/2019 | Koyama et al. | |

FOREIGN PATENT DOCUMENTS

| | | | | |
|---|---|---|---|---|
| JP | H05-215995 A | 8/1993 | | |
| JP | H11-315059 A | 11/1999 | | |
| JP | 2000-204069 A | 7/2000 | | |
| JP | 2013-544823 A | 12/2013 | | |
| WO | WO-2009128302 A1 * | 10/2009 | ............. | G03F 7/027 |
| WO | 2012/157566 A1 | 11/2012 | | |
| WO | 2017/135084 A1 | 8/2017 | | |

OTHER PUBLICATIONS

International Search Report (Form PCT/ISA/210) issued on Jan. 15, 2019, by the Japan Patent Office in corresponding International Application No. PCT/JP2018/043467. (2 pages).

English translation of JP 2000-204069 A, which was previously submitted with the Information Disclosure Statement on Jul. 7, 2021, and also cited in Extended European Search Report issued Jul. 19, 2021, for EP Application No. 18884208.2.

Bacchi, et al., "Characterization of methacrylate-based composites containing thiourethane oligomers", Dental Materials, 2016, vol. 32, No. 2, pp. 233 to 239.

English translation of JP 2000-204069 A, which was previously submitted with the Information Disclosure Statement on Jul. 7, 2021, and also cited in Extended European Search Report issued Jul. 19, 2021, for corresponding EP Application No. 18884208.2.

Bacchi, et al., "Characterization of methacrylate-based composites containing thiourethane oligomers", Dental Materials, 2016, vol. 32, No. 2, pp. 233 to 239, which was cited in Office Action issued Jul. 23, 2021, for corresponding Chinese patent application No. 201880067684.3.

* cited by examiner

(METH)ACRYLATE AND USE THEREOF

TECHNICAL FIELD

The present invention relates to a (meth)acrylate and use thereof.

BACKGROUND ART

Composite resins which are a typical example of dental material compositions typically contain a monomer composition containing a monomer, a filler, a polymerization initiator, a polymerization inhibitor, a dye, and the like. Looking at the weight ratio of each component in such a composite resin, the filler usually has the largest weight ratio, followed by a monomer composition, and these two components account for most of the weight of the composite resin. The monomer composition serves as a binder for the filler. The properties of monomers, and the properties of cured products thereof are significantly influential on the properties and performance of the composite resin containing the monomer composition, and cured products thereof.

From the viewpoints of such as the biological safety of monomers and the mechanical strength and wear resistance of cured products, radically polymerizable polyfunctional methacrylate compositions are frequently used as the monomer compositions. As a typical example, the polyfunctional methacrylate compositions mainly contain 2,2-bis[4-(3-methacryloyloxy-2-hydroxypropoxy)phenyl]propane (hereinafter, referred to as Bis-GMA) or 2,2,4-trimethylhexamethylenebis(2-carbamoyloxyethyl)dimethacrylate (hereinafter, referred to as UDMA), and contain triethylene glycol dimethacrylate (hereinafter, referred to as TEGDMA) to adjust the viscosity.

In the dental clinical practice, the restoration of tooth defects using composite resins has a long history, and the use range of the composite resins is also expanding. However, the mechanical properties of a composite resin cured product are still insufficient. In particular, under an actual condition, the poor strength obstructs the application of the resins to sites subjected to a high stress, for example, molar tooth crowning materials.

In recent years, the clinical practice strongly demands the expansion of the application of composite resins to such high-stress sites. Therefore, the development of composite resins having higher mechanical properties is an urgent necessity. As described above, the properties of cured products of monomer compositions contained in composite resins significantly affect the properties of cured products of the composite resins containing the compositions.

There have been reported, as examples, trials to use monomers replacing Bis-GMA and UDMA which are widely used as main components of monomer compositions so as to enhance the mechanical strength of cured products of composite resins (Patent Literature 1 and Patent Literature 2).

Examples of trials to improve main component monomers include an enhancement in main component monomers so as to enhance the refractive index of cured products of monomer compositions (Patent Literature 3), and an enhancement in main component monomers so as to enhance the polymerization shrinkage before and after the curing of monomer compositions (Patent Literature 4).

CITATION LIST

Patent Literature

Patent Literature 1: Japanese Patent Laid-Open No. 2000-204069
Patent Literature 2; National Publication of International Patent Application No. 2013-544823
Patent Literature 3: Japanese Patent Laid-Open No. 11-315059
Patent Literature 4: International Publication No. WO2012-157566

SUMMARY OF INVENTION

Technical Problem

As described above, the expansion of the application ranges of dental material compositions containing monomers or monomer compositions including composite resins makes it necessary to enhance the mechanical properties of cured products of the dental material compositions.

In view of the problems, it is an object of the present invention to provide a monomer which can provide a cured product having both high toughness and rigidity, a monomer composition containing the monomer, a molded body obtained by curing the monomer composition, a dental material composition containing the monomer composition, a dental material obtained by curing the dental material composition, a method for producing the monomer composition, and a method for producing the dental material.

Solution to Problem

After extensive studies, the present inventors have found that a cured product of a monomer composition containing a (meth)acrylate (D) to be described later exhibits high mechanical properties, and particularly has enhanced breaking energy and breaking strength, and have completed the present invention.

The present invention can be shown below, for example.

[1] A (meth)acrylate (D) which is a reaction product of a thiol compound (A) having two or more mercapto groups; an iso(thio)cyanate compound (B) having two or more iso(thio)cyanato groups; and a hydroxy (meth)acrylate compound (C) having one or more polymerizable groups.

[2] The (meth)acrylate (D) according to the above [1], wherein the (meth)acrylate (D) has a structure represented by the following general formula (D1) and a structure represented by the following general formula (D2):

[Chem. 1]

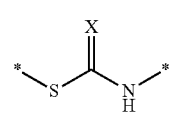
(D1)

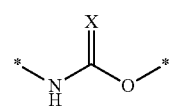
(D2)

wherein
X represents an oxygen atom or a sulfur atom; and
* represents a point of attachment.

[3] The (meth)acrylate (D) according to the above [1], wherein the (meth)acrylate (D) is represented by the following general formula (1):

[Chem. 2]

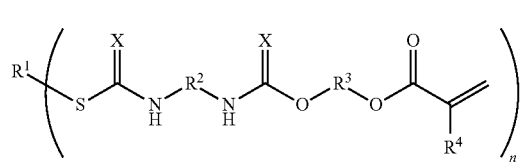

(1)

wherein $R^1$ is a residue excluding all mercapto groups from a thiol compound (A1) having three or four mercapto groups;

$R^2$ is a residue excluding all iso(thio)cyanato groups from an iso(thio)cyanate compound (B1) having two iso(thio)cyanato groups;

$R^3$ is a residue excluding one (meth)acryloyloxy group and one hydroxy group from the hydroxy (meth)acrylate compound (C);

$R^4$ represents a hydrogen atom or a methyl group;

X represents an oxygen atom or a sulfur atom:

n represents the number of all the mercapto groups contained in the thiol compound (A1); and a plurality of $R^2$, $R^3$, $R^4$, and X may each be the same as or different from each other.

[4] The (meth)acrylate (D) according to the above [3], wherein in the general formula (1), $R^1$ has a molecular weight of 150 to 400.

[5] The (meth)acrylate (D) according to the above [3] or [4], wherein in the general formula (1), $R^1$ is a group represented by the following formula (2), (3), (4-1), (4-2), or (4-3).

[Chem. 3]

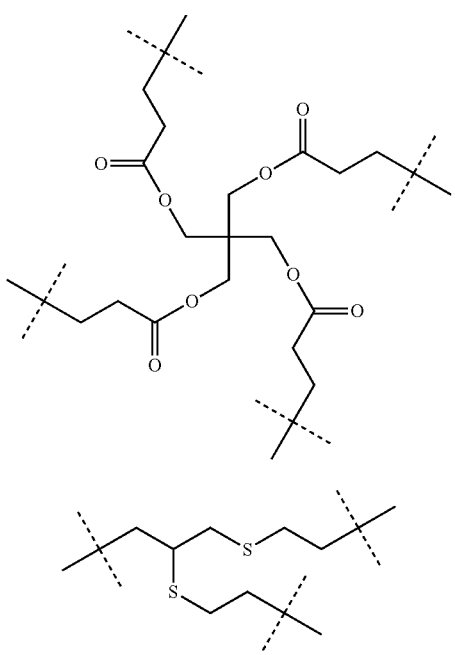

(2)

(3)

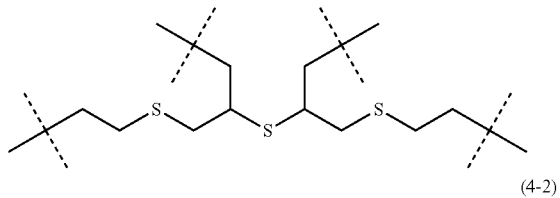

(4-1)

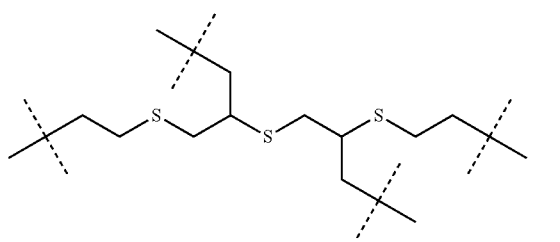

(4-2)

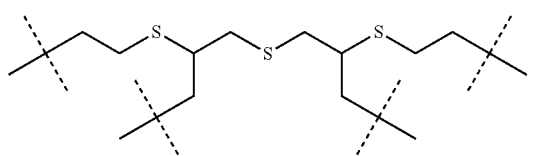

(4-3)

[6] The (meth)acrylate (D) according to any one of the above [3] to [5], wherein in the general formula (1), $R^2$ is a group represented by the following formula (5), (6), (7), or (8).

[Chem. 4]

(5)

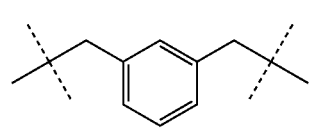

(6)

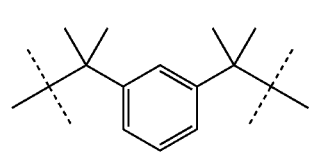

(7)

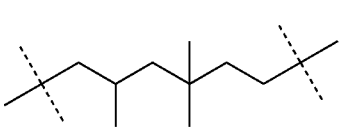

(8)

[7] The (meth)acrylate (D) according to any one of the above [3] to [6], wherein $R^3$ in the general formula (1) is a $C_{2-6}$ linear alkylene group in which a hydrogen atom may be substituted with a $C_{1-3}$ alkyl group, or a linear oxyalkylene group in which a hydrogen atom may be substituted with a $C_{1-3}$ alkyl group.

[8] The (meth)acrylate (D) according to any one of the above [1] to [7], wherein the (meth)acrylate (D) has a viscosity of 1 to 50000 mPa·s at 65° C.

[9] The (meth)acrylate (D) according to the above [1] or [2], wherein a ratio (a/b) of a number of moles of the mercapto groups of the thiol compound (A), a, to a number of moles of the iso(thio)cyanato groups of the iso(thio) cyanate compound (B), b, is 0.01 to 0.20.

[10] The (meth)acrylate (D) according to the above [1], [2], or [9], wherein the thiol compound (A) is at least one selected from the group consisting of trimethylolpropane tris(3-mercaptopropionate), pentaerythritol tetrakis(2-mercaptoacetate), pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, and 1,1,3,3-tetrakis(mercaptomethylthio)propane.

[11] The (meth)acrylate (D) according to the above [1], [2], [9], or [10], wherein the iso(thio)cyanate compound (B) is at least one selected from the group consisting of hexamethylene diisocyanate, 2,2,4-trimethylhexane diisocyanate, 2,4,4-trimethylhexamethylene diisocyanate, pentamethylene diisocyanate, m-xylylene diisocyanate, isophorone diisocyanate, bis(isocyanatomethyl)cyclohexane, bis(isocyanatocyclohexyl)methane, 2,5-bis(isocyanatomethyl)bicyclo-[2.2.1]-heptane, 2,6-bis(isocyanatomethyl)bicyclo-[2.2.1]-heptane, tolylene diisocyanate, phenylene diisocyanate, and 4,4'-diphenylmethane diisocyanate.

[12] A monomer composition comprising the (meth) acrylate (D) according to any one of the above [1] to [11].

[13] The monomer composition according to the above [12], wherein the monomer composition is a dental material monomer composition.

[14] The monomer composition according to the above [12] or [13], wherein the monomer composition contains a polymerizable compound (E) containing at least one polymerizable group selected from a methacryloyl group and an acryloyl group (excluding a (meth)acrylate (D)).

[15] A molded body obtained by curing the monomer composition according to any one of the above [12] to [14].

[16] A dental material composition comprising: the monomer composition according to any one of the above [12] to [14]; a polymerization initiator; and a filler.

[17] A dental material obtained by curing the dental material composition according to the above [16].

[18] A method for producing a monomer composition, comprising the steps of: (i) reacting a thiol compound (A) having two or more mercapto groups with an iso(thio) cyanate compound (B) having two or more iso(thio)cyanato groups to obtain an intermediate; and (ii) reacting the intermediate with a hydroxy (meth)acrylate compound (C) having one or more polymerizable groups.

[19] A method for producing a dental material, comprising the steps of: injecting the dental material composition according to the above [17] into a casting mold; and polymerizing and curing the dental material composition in the casting mold.

Advantageous Effects of Invention

The cured product having both high toughness and rigidity is obtained from the monomer composition containing the (meth)acrylate (D) of the present invention. The cured product has high mechanical properties.

DESCRIPTION OF EMBODIMENTS

Figure 1:
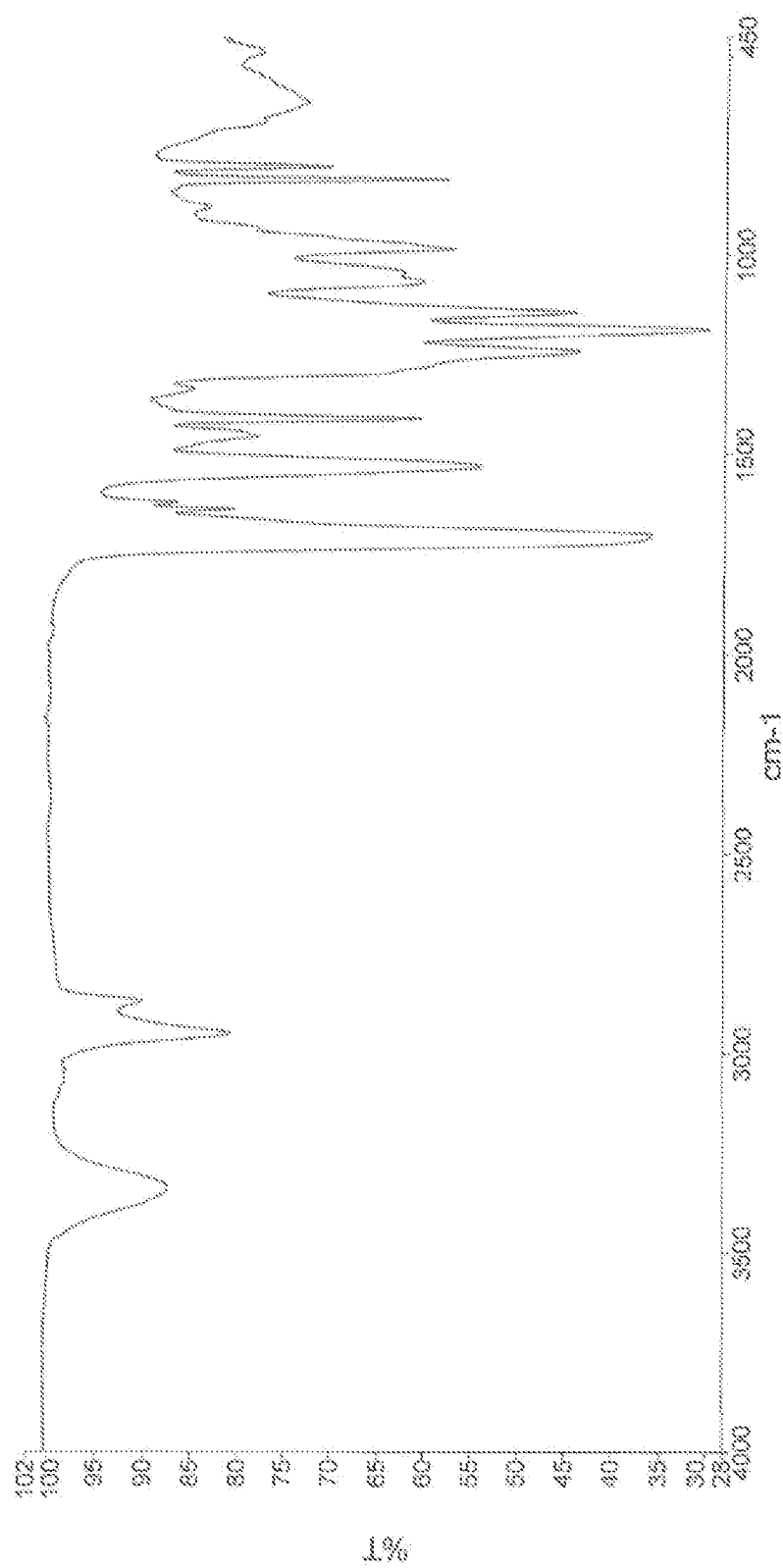
FIG. 1 shows an IR spectrum of a composition containing a thiourethane acrylate (D-3) obtained in Example 3.

Hereinafter, the present invention will be described in detail.

<<(Meth)Acrylate (D)>>

A (meth)acrylate (D) of the present invention is a reaction product of a thiol compound (A) having two or more mercapto groups; an iso(thio)cyanate compound (B) having two or more iso(thio)cyanato groups; and a hydroxy (meth)acrylate compound (C) having one or more polymerizable groups.

The (meth)acrylate (D) is usually a monomer which can be polymerized, and can be used as one component of a monomer composition, for example.

Herein, the iso(thio)cyanato group means an isocyanato group (—NCO) or an isothiocyanato group (—NCS), and the iso(thio)cyanate compound means an isocyanate compound or an isothiocyanate compound. Herein, the (meth) acrylate compound means an acrylate compound or a methacrylate compound.

When a compound having an isocyanato group is used as the iso(thio)cyanate compound (B), the (meth)acrylate (D) is a thiourethane (meth)acrylate. When a compound having an isothiocyanato group is used, the (meth)acrylate (D) is a (meth)acrylate having a structure in which C=O constituting thiourethane in the thiourethane (meth)acrylate is substituted with C=S. In the present invention, both the (meth) acrylates are sometimes collectively referred to as a thiourethane type (meth)acrylate. The (meth)acrylate (D) is preferably a thiourethane (meth)acrylate from the viewpoint of mechanical properties.

The (meth)acrylate (D) may or may not have a mercapto group. For example, in the reaction of the thiol compound (A), the iso(thio)cyanate compound (B), and the hydroxy (meth)acrylate compound (C), all the mercapto groups of the thiol compound (A) may be reacted, or some mercapto groups of the thiol compound (A) may not be reacted. In this case, a mixture of the (meth)acrylate (D) which is a reaction product and the unreacted thiol compound (A) may be generated. The presence or absence of the mercapto group can be confirmed by FT-IR measurement, for example.

The (meth)acrylate (D) may or may not have an iso(thio) cyanato group. For example, in the reaction of the thiol compound (A), the iso(thio)cyanate compound (B), and the hydroxy (meth)acrylate (C), all the iso(thio)cyanato groups of the iso(thio)cyanate compound (B) may be reacted, or some iso(thio)cyanato groups of the iso(thio)cyanate compound (B) may not be reacted. In this case, a mixture of the (meth)acrylate (D) which is a reaction product and the unreacted iso(thio)cyanate compound (B) may be generated. The presence or absence of the iso(thio)cyanato group can be confirmed by FT-IR measurement, for example.

The (meth)acrylate (D) may have a mercapto group and/or an iso(thio)cyanato group, and may further have a hydroxy group. For example, in the reaction of the thiol compound (A), the iso(thio)cyanate compound (B), and the hydroxy (meth)acrylate (C), some hydroxy groups of the hydroxy (meth)acrylate compound (C) may not be reacted. In this case, a mixture of the (meth)acrylate (D) which is a reaction product and the unreacted hydroxy (meth)acrylate compound (C) may be generated. The presence or absence of the (meth)acryloyloxy group can be confirmed by FT-IR measurement, for example.

The (meth)acrylate (D) of the present invention preferably has a structure represented by the following general formula (D1) and a structure represented by the following general formula (D2).

[Chem. 5]

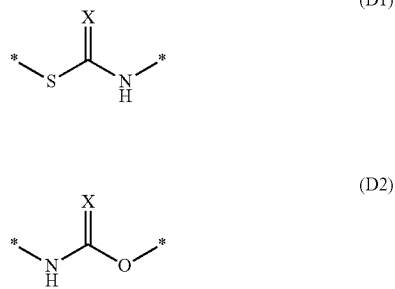

In the general formulas (D1) and (D2), X represents an oxygen atom or a sulfur atom, and * represents a point of attachment. X is preferably an oxygen atom from the viewpoint of mechanical properties.

The structure represented by the following general formula (D1) is usually formed by a reaction between the mercapto group contained in the thiol compound (A) and the iso(thio)cyanato group contained in the iso(thio)cyanate compound (B). The structure represented by the following general formula (D2) is usually formed by a reaction between the iso(thio)cyanato group contained in the iso(thio)cyanate compound (B) and the hydroxy group contained in the hydroxy (meth)acrylate compound (C).

The thiol compound (A) is preferably a thiol compound (A1) having three or four mercapto groups from the viewpoint of the mechanical properties of a cured product of the obtained (meth)acrylate (D).

The iso(thio)cyanate compound (B) is preferably an iso(thio)cyanate compound (B1) having two iso(thio)cyanato groups from the viewpoint of the handleability of the obtained (meth)acrylate (D).

The (meth)acrylate (D) of the present invention is preferably a compound represented by the following general formula (1).

[Chem. 6]

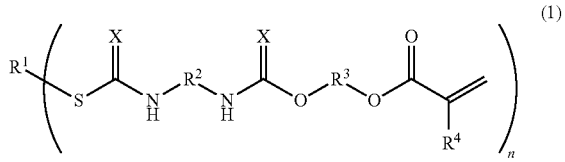

The meaning of each of symbols in the general formula (1) is as follows.

$R^1$ is a residue excluding all mercapto groups from a thiol compound (A1) having three or four mercapto groups.

$R^2$ is a residue excluding all iso(thio)cyanato groups from an iso(thio)cyanate compound (B1) having two iso(thio)cyanato groups.

$R^3$ is a residue excluding one (meth)acryloyloxy group and one hydroxy group from the hydroxy (meth)acrylate compound (C).

$R^4$ represents a hydrogen atom or a methyl group.

X represents an oxygen atom or a sulfur atom.

n represents the number of all the mercapto groups contained in the thiol compound (A1). That is, n represents an integer of 3 or 4.

A plurality of $R^2$, $R^3$, $R^4$, and X may each be the same as or different from each other.

In the general formula (1), $R^2$ is preferably a $C_{6-20}$ trivalent or tetravalent hydrocarbon group, and may have one or more of at least one kind bond selected from a sulfide bond and an ester bond in the hydrocarbon group.

In one preferred aspect of $R^1$ of the general formula (1), the molecular weight of $R^1$ is 150 to 400.

Examples of the $C_{6-20}$ trivalent or tetravalent hydrocarbon group include a trimethylolpropane tris(propionate) group, a pentaerythritol tetrakis(acetate) group, a pentaerythritol tetrakis(propionate) group, a 5-ethyl-4,7-dithiaoctyl group, and a 6,8-diethyl-4,7,10-trithiatridecyl group.

In one preferred aspect of $R^1$ of the general formula (1), $R^1$ is a group represented by the following formula (2), (3), (4-1), (4-2), or (4-3).

[Chem. 7]

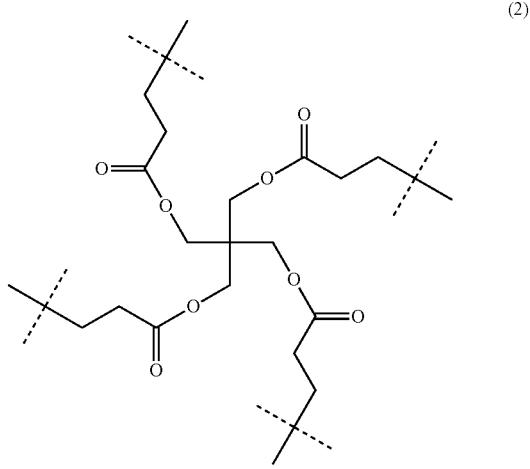

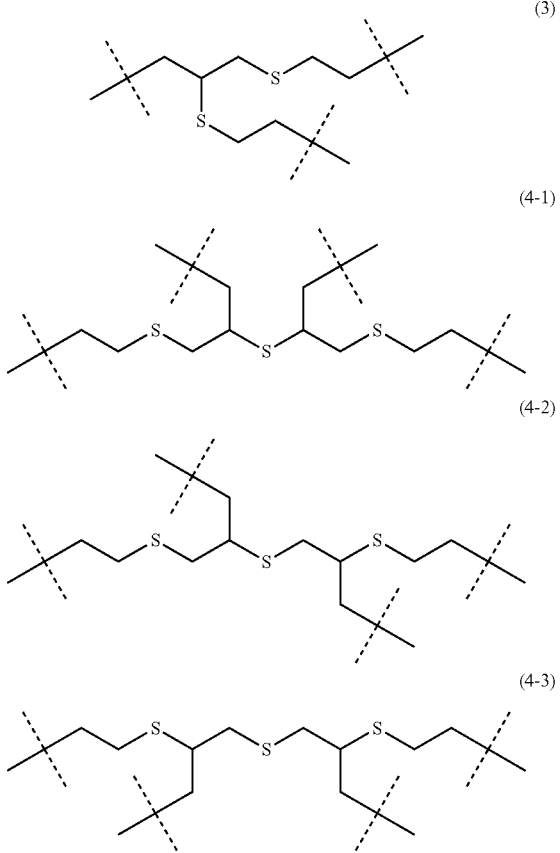

(3)

(4-1)

(4-2)

(4-3)

Preferably, in the general formula (1), each $R^2$ is independently a group in which a $CR_2$ group is bonded to each of both ends of one divalent group selected from a $C_{6-12}$ divalent aromatic hydrocarbon group, a $C_{5-12}$ divalent chain-like hydrocarbon group, and a $C_{5-12}$ divalent alicyclic hydrocarbon group. The $CR_2$ group is bonded to a nitrogen atom of a NH group adjacent to the $CR_2$ group. R is a hydrogen atom or a $C_{1-3}$ alkyl group. A plurality of $R^2$ may be the same as or different from each other.

From the viewpoint of having appropriate rigidity, the number of carbon atoms of the divalent aromatic hydrocarbon group, the divalent chain-like hydrocarbon group, or the divalent alicyclic hydrocarbon group contained in $R^2$ is usually 5 to 12, and preferably 6 to 12. Examples of the $C_{5-12}$ alicyclic hydrocarbon group include an isophorone group, a cyclohexyl methylene group, and a bicyclo[2.2.1]hepthylene group. Of these, from the viewpoint of the toughness of the cured product, a bicyclo[2.2.1]hepthylene group is preferred. Examples of the $C_{5-12}$ chain-like hydrocarbon group include a pentamethylene group, a hexamethylene group, and a trimethylhexamethylene group. Of these, from the viewpoint of the toughness of the cured product, a trimethylhexamethylene group is preferred. Examples of the $C_{6-12}$ aromatic hydrocarbon group include a phenylene group.

Examples of the $CR_2$ group include a $CH_2$ group (methylene group) in which each R is a hydrogen atom, and a $C(CH_3)_2$ group in which each R is a methyl group.

When a group bonded to two $CR_2$ groups contained in $R^2$ is the aromatic hydrocarbon group, the two $CR_2$ groups may be present at ortho positions, meta positions, or para positions with respect to each other on the benzene ring contained in the aromatic hydrocarbon group. To exhibit the advantageous effects of the present invention, these two $CR_2$ groups are preferably present at meta positions or para positions with respect to each other, and more preferably at meta positions with respect to each other.

When a group bonded to two $CR_2$ groups contained in $R^2$ is the alicyclic hydrocarbon group, the positional relationship of the two $CR_2$ groups with respect to each other on the carbon ring contained in the alicyclic hydrocarbon group is not particularly limited. To exhibit the advantageous effects of the present invention, it is preferable that these two $CR_2$ groups are not bonded to the same carbon atom in the carbon ring, and it is more preferable that one of these two $CR_2$ groups is bonded to carbon atoms in the carbon ring to which the other $CR_2$ group is bonded, and which are separate from each other through two or more carbon atoms in the carbon ring.

The regioisomers differing in the positions of these two $CR_2$ groups may be used singly, or two or more kinds of such isomers may be used as a mixture.

Specifically, $R^2$ is preferably a group selected from groups represented by the following formula (5), (6), (7) or (8). In the case of the group represented by the general formula (5), the group is generally a mixture of regioisomers having the methylene groups bonded to 2,5-positions and 2,6-positions.

[Chem. 8]

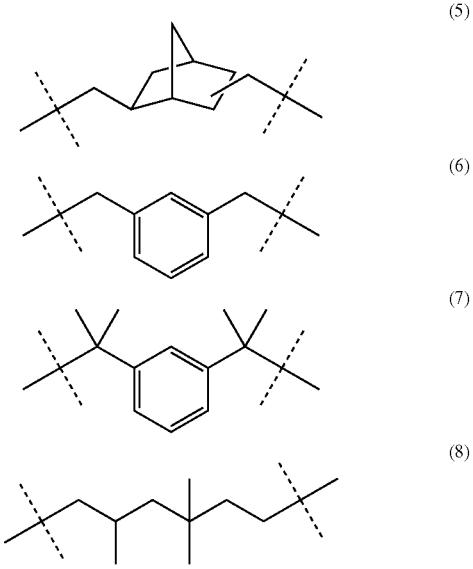

(5)

(6)

(7)

(8)

In the general formula (1), each $R^3$ is independently represent a $C_{2-6}$ linear alkylene group in which a hydrogen atom may be substituted with a $C_{1-3}$ alkyl group or a (meth)acryloyloxymethylene group, or a linear oxyalkylene group in which a hydrogen atom may be substituted with a $C_{1-3}$ alkyl group or a (meth)acryloyloxymethylene group. A plurality of $R^3$ may be the same as or different from each other.

A preferred aspect of $R^3$ of the general formula (1) is a $C_{2-6}$ (preferably $C_{2-4}$) linear alkylene group in which any hydrogen atom may be substituted with a $C_{1-3}$ alkyl group, or a linear oxyalkylene group in which any hydrogen atom may be substituted with a $C_{1-3}$ alkyl group.

Examples of the linear alkylene groups include —$CH_2CH_2$—, —$CH_2CH_2CH_2$—, —$CH_2CH_2CH_2CH_2$—, —$CH_2CH_2CH_2CH_2CH_2$—, and —CH$_2$CH$_2$CH$_2$CH$_2$CH$_2$CH$_2$—. A preferred aspect of these linear alkylene groups is, for example, —CH$_2$CH$_2$—, —CH$_2$CH$_2$CH$_2$—, —CH$_2$CH$_2$CH$_2$CH$_2$— or the like.

Examples of the linear oxyalkylene groups include —CH$_2$CH$_2$OCH$_2$CH$_2$—, and —CH$_2$CH$_2$OCH$_2$CH$_2$OCH$_2$CH$_2$—. A preferred aspect of the linear oxyalkylene group is, for example, —CH$_2$CH$_2$OCH$_2$CH$_2$—.

From the viewpoint that the (meth)acrylate (D) exhibits appropriate flexibility, the linear alkylene groups or the linear oxyalkylene groups each usually have 2 to 6 carbon atoms, preferably 2 to 4 carbon atoms, and more preferably 2 carbon atoms.

Examples of the alkyl groups which may substitute for hydrogen atoms contained in the linear alkylene groups or the linear oxyalkylene groups include CH$_3$—, CH$_3$CH$_2$—, CH$_3$CH$_2$CH$_2$-, and (CH$_3$)$_2$CH—. From the viewpoint that the (meth)acrylate (D) exhibits appropriate flexibility, the alkyl groups preferably have 1 to 3 carbon atoms, more preferably 1 to 2 carbon atoms, and still more preferably 1 carbon atom.

Examples of the (meth)acryloyloxymethylene groups which may substitute for hydrogen atoms contained in the linear alkylene group or the linear oxyalkylene group include a methacryloyloxymethylene group and an acryloyloxymethylene group.

$R^4$ represents a hydrogen atom or a methyl group. From the viewpoint of the toughness of the cured product, $R_4$ is preferably a hydrogen atom. A plurality of $R^4$ may each be the same as or different from each other.

From the viewpoint of obtaining cured products having excellent toughness, it is preferable that the polymerizable groups of the (meth)acrylate (D) include a smaller number of methacryloyl groups and a larger number of acryloyl groups. It is more preferable that the polymerizable groups contain only the acryloyl groups ($R^4$ is a hydrogen atom and the (meth)acryloyloxymethylene groups which can be present in $R^3$ are the acryloyloxymethylene groups).

The substituent in $R^3$ preferably substitutes for a hydrogen atom bonded to the carbon atom which is adjacent to the carbon atom in the linear alkylene group or the linear oxyalkylene group which is adjacent to the (meth)acryloyl group present at both end positions of the (meth)acrylate (D).

The number of the alkyl groups which can substitute for hydrogen atoms and the (meth)acryloyloxymethylene groups which can substitute for hydrogen atoms is preferably 0 to 8 for each $R_3$, although not particularly limited thereto. From the viewpoint that the (meth)acrylate (D) exhibits appropriate flexibility, the number of such substituents is more preferably 0 to 4, still more preferably 0 to 2, and particularly preferably 0, namely, no such substituents.

X represents an oxygen atom or a sulfur atom. When X is an oxygen atom, the (meth)acrylate (D) is a thiourethane (meth)acrylate. In the case where X is an oxygen atom and in the case where X is a sulfur atom, in the present invention, the (meth)acrylate (D) may be collectively referred to as a thiourethane type (meth)acrylate. X is preferably an oxygen atom from the viewpoint of mechanical properties.

When the (meth)acrylate (D) which is such a thiourethane type (meth)acrylate is contained in the monomer composition of the present invention, the cured product obtained from the composition has both toughness and rigidity.

Hereinafter, components which are raw materials of the (meth)acrylate (D) will be described in detail.

[Thiol Compound (A) Having Two or More Mercapto Groups]

The thiol compound (A) having two or more mercapto groups is a compound having two or more mercapto groups, and means a thiol compound. The thiol compound (A) preferably has three or more mercapto groups. The thiol compound (A) is more preferably a thiol compound (A1) having three or four mercapto groups.

Examples of the thiol compound (A) having two or more mercapto groups include a compound selected from the group consisting of an aliphatic polythiol compound, an aromatic polythiol compound, and a heterocyclic polythiol compound.

More specific examples of the thiol compound having three or more mercapto groups include aliphatic polythiol compounds such as 1,2,3-propanetrithiol, tetrakis(mercaptomethyl)methane, trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, and esters of thioglycolic acid and mercaptopropionic acid of these;

aliphatic polythiol compounds such as 1,1,3,3-tetrakis (mercaptomethylthio)propane, 1,1,2,2-tetrakis(mercaptomethylthio)ethane, tris(mercaptomethylthio)methane, and tris (mercaptoethylthio)methane;

aromatic polythiol compounds such as 1,3,5-trimercaptobenzene, 1,3,5-tris(mercaptomethyl)benzene, 1,3,5-tris (mercaptomethyleneoxy)benzene, and 1,3,5-tris(mercaptoethyleneoxy)benzene; and heterocyclic polythiol compounds such as 2,4,6-trimercapto-s-triazine and 2,4,6-trimercapto-1,3,5-triazine.

Examples of the thiol compound having two mercapto groups include aliphatic polythiol compounds such as methane dithiol, 1,2-ethanedithiol, 1,2-cyclohexane dithiol, bis(2-mercaptoethyl)ether, diethylene glycol bis(2-mercaptoacetate), diethylene glycol bis(3-mercaptopropionate), ethylene glycol bis (2-mercaptoacetate), ethylene glycol bis(3-mercaptopropionate), bis(mercaptomethyl)sulfide, bis (mercaptomethyl)disulfide, bis(mercaptoethyl)sulfide, bis (mercaptoethyl)disulfide, bis(mercaptopropyl)sulfide, bis (mercaptomethylthio)methane, bis(2-mercaptoethylthio) methane, bis(3-mercaptopropylthio)methane, 1,2-bis (mercaptomethylthio)ethane, 1,2-bis(2-mercaptoethylthio) ethane, 1,2-bis(3-mercaptopropylthio)ethane, 2,5-dimercaptomethyl-1,4-dithiane, 2,5-dimercapto-1,4-dithiane, 2,5-dimercaptomethyl-2,5-dimethyl-1,4-dithiane, and esters of thioglycolic acid and mercaptopropionic acid of these;

aliphatic polythiol compounds such as bis(2-mercaptoethyl)sulfide, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2-mercaptoethyl ester), and 4,6-bis(mercaptomethylthio)-1,3-dithiane;

aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 2,5-toluenedithiol, 3,4-toluenedithiol, 1,5-naphthalenedithiol, and 2,6-naphthalenedithiol; and heterocyclic polythiol compounds such as 2-methylamino-4,6-dithiol-sym-triazine, 3,4-thiophenedithiol, bismuthiol, 4,6-bis(mercaptomethylthio)-1,3-dithiane, and 2-(2,2-bis(mercaptomethylthio)ethyl)-1,3-dithietane.

The thiol compound (A) is a thiol compound (A1) represented by $R^1$—$(SH)_n$, for example. $R^1$ and n are as defined for those of $R^1$ and n of the general formula (1), respectively.

One selected from the thiol compounds (A) may be used, or two or more thereof may be used in combination.

From the viewpoint of the advantageous effects of the present invention, it is preferable that at least one compound selected from the group consisting of trimethylolpropane tris(3-mercaptopropionate), pentaerythritol tetrakis(2-mercaptoacetate), pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, and 1,1,3,3-tetrakis(mercaptomethylthio)propane is used as the thiol compound having three or more mercapto groups which can be preferably used in the present embodiment.

It is particularly preferable that at least one compound selected from the group consisting of pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane is used.

[Iso(Thio)Cyanate Compound (B) Having Two or More Iso(Thio)Cyanato Groups]

The iso(thio)cyanate compound (B) is a compound having two or more iso(thio)cyanato groups. The compound (B) is preferably an iso(thio)cyanate compound (B1) having two iso(thio)cyanato groups.

Examples of the iso(thio)cyanate compound (B) include an aliphatic polyisocyanate compound, an alicyclic polyisocyanate compound, an aromatic polyisocyanate compound, a heterocyclic polyisocyanate compound, an aliphatic polyisothiocyanate compound, an alicyclic polyisothiocyanate compound, an aromatic polyisothiocyanate compound, and a sulfur-containing heterocyclic polyisothiocyanate compound and modified products thereof.

More specific examples of the isocyanate compound include an aliphatic polyisocyanate compound such as pentamethylene diisocyanate, hexamethylene diisocyanate, 2,2,4-trimethylhexane diisocyanate, 2,4,4-trimethylhexamethylene diisocyanate, lysine diisocyanate methyl ester, lysine triisocyanate, m-xylylene diisocyanate, p-xylene diisocyanate, α,α,α',α'-tetramethylxylylene diisocyanate, bis(isocyanatomethyl)naphthalene, mesitylylene triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, or bis(isocyanatomethylthio)ethane;

an alicyclic polyisocyanate compound such as isophorone diisocyanate, bis(isocyanatomethyl)cyclohexane, dicyclohexylmethane-4,4'-diisocyanate, cyclohexane diisocyanate, methyl cyclohexane diisocyanate, dicyclohexyl dimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, or 4,9-bis(isocyanatomethyl)tricyclodecane;

an aromatic polyisocyanate compound such as phenylene diisocyanate, 2,4-tolylene diisocyanate, 2,6-tolylene diisocyanate, 4,4'-diphenylmethane diisocyanate, or diphenyl sulfide-4,4-diisocyanate; and a heterocyclic polyisocyanate compound such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, or 4,5-bis(isocyanatomethyl)-1,3-dithiolane.

Examples of the isothiocyanate compound include aliphatic polyisothiocyanate compounds such as hexamethylene diisothiocyanate, lysine diisothiocyanate methyl ester, lysine triisothiocyanate, m-xylylene diisothiocyanate, bis(isothiocyanatomethyl)sulfide, bis(isothiocyanatoethyl)sulfide, and bis(isothiocyanatoethyl)disulfide;

alicyclic polyisothiocyanate compounds such as isophorone diisothiocyanate, bis(isothiocyanatomethyl)cyclohexane, dicyclohexylmethane diisothiocyanate, cyclohexane diisothiocyanate, methyl cyclohexane diisothiocyanate, 2,5-bis(isothiocyanatomethyl)bicyclo-[2.2.1]-heptane, 2,6-bis(isothiocyanatomethyl)bicyclo-[2.2.1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, and 4,9-bis(isothiocyanatomethyl)tricyclodecane;

aromatic polyisothiocyanate compounds such as tolylene diisothiocyanate, 4,4-diphenylmethane diisothiocyanate, and diphenyl sulfide-4,4-diisothiocyanate; and sulfur-containing heterocyclic polyisothiocyanate compounds such as 2,5-diisothiocyanatothiophene, 2,5-bis(isothiocyanatomethyl)thiophene, 2,5-isothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, and 4,5-bis(isothiocyanatomethyl)-1,3-dithiolane.

A prepolymer type modified product with a halogen substitute such as a chlorine substitute or a bromine substitute of these, an alkyl substitute, an alkoxy substitute, a nitro substitute, or polyhydric alcohol, a carbodiimide modified product, a urea modified product, a burette modified product, or a dimerization or trimerization reaction product can be used.

The iso(thio)cyanate compound (B) is a compound represented by $R^2$—$(NCX)_2$, for example. $R^2$ and X are as defined for those of $R^2$ and X of the general formula (1), respectively.

Of these iso(thio)cyanate compounds (B), hexamethylene diisocyanate, 2,2,4-trimethylhexane diisocyanate, 2,4,4- trimethylhexamethylene diisocyanate, pentamethylene diisocyanate, m-xylylene diisocyanate, isophorone diisocyanate, bis(isocyanatomethyl)cyclohexane, bis(isocyanatocyclohexyl)methane, 2,5-bis(isocyanatomethyl)bicyclo-[2.2.1]-heptane, 2,6-bis(isocyanatomethyl)bicyclo-[2.2.1]-heptane, tolylene diisocyanate, phenylene diisocyanate, and 4,4'-diphenylmethane diisocyanate are preferred, and 2,2,4-trimethylhexane diisocyanate, 2,4,4-trimethylhexamethylene diisocyanate, m-xylylene diisocyanate, bis(isocyanatomethyl)cyclohexane, bis(isocyanatocyclohexyl)methane, 2,5-bis(isocyanatomethyl)bicyclo-[2.2.1]-heptane, and 2,6-bis(isocyanatomethyl)bicyclo-[2.2.1]-heptane are more preferred.

The iso(thio)cyanate compounds (B) may be used singly, or two or more thereof may be used.

[Hydroxy (Meth)Acrylate Compound (C) Having One or More Polymerizable Groups]

The hydroxy (meth)acrylate compound (C) having one or more polymerizable groups is a compound having at least one polymerizable group selected from a methacryloyl group and an acryloyl group, and a hydroxy group.

The hydroxy (meth)acrylate compound (C) is a compound represented by $CH_2=C(R^4)-COO-R^3-OH$, for example. $R^3$ and $R^4$ are as defined for those of $R^3$ and $R^4$ of the general formula (1), respectively.

The hydroxy (meth)acrylate compound (C) is preferably a hydroxy (meth)acrylate compound (C1) having one polymerizable group selected from a methacryloyl group and an acryloyl group, and one hydroxy group from the viewpoint of the handleability of the obtained (meth)acrylate (D).

Examples of the hydroxy acrylate compound having one polymerizable group and one hydroxyl group include 2-hydroxyethyl acrylate, 2-hydroxypropyl acrylate, 2-hydroxybutyl acrylate, 2-hydroxy-3-phenoxypropyl acrylate, 4-hydroxybutyl acrylate and 1,4-cyclohexanedimethanol monoacrylate.

Examples of the hydroxy methacrylate compound having one polymerizable group and one hydroxy group include 2-hydroxyethyl methacrylate, 2-hydroxypropyl methacrylate, 2-hydroxybutyl methacrylate, 2-hydroxy-3-phenoxypropyl methacrylate, 4-hydroxybutyl methacrylate, and 1,4-cyclohexanedimethanol monomethacrylate.

The hydroxy (meth)acrylate compounds (C) having one or more polymerizable groups may be used singly, or two or more thereof may be used.

[Producing Method of (Meth)Acrylate (D)]

The (meth)acrylate (D) of the present invention is obtained by reacting the thiol compound (A), the iso(thio)cyanate compound (B), and the hydroxy (meth)acrylate compound (C) with one another as described above, but the reaction can be carried out by a known method or a substantially known method. In one preferred embodiment of the (meth)acrylate (D), the (meth)acrylate (D) is obtained by reacting the thiol compound (A1), the iso(thio)cyanate compound (B1), and the hydroxy (meth)acrylate compound (C1) with one another.

During the reaction, a catalyst may be added, or may not be added, but a catalyst is preferably added in order to enhance the reaction rate. Known catalysts accelerating the reaction between the mercapto group contained in the thiol compound (A) and the iso(thio)cyanato group contained in the iso(thio)cyanate compound (B), and the reaction between the hydroxy group contained in the hydroxy (meth)acrylate compound (C) and the iso(thio)cyanato group contained in the iso(thio)cyanate compound (B) may be used as the catalysts.

Examples of the catalyst include organotin compounds such as dibutyltin dilaurate, dibutyltin dioctoate and tin octanoate; halogenated tin compounds such as dibutyltin dichloride and dimethyltin dichloride; organic compounds of metals other than tin such as copper naphthenate, cobalt naphthenate, zinc naphthenate, acetylacetonatozirconium, acetylacetonatoiron and acetylacetonatogermanium; amine compounds and salts thereof such as triethylamine, 1,4-diazabicyclo[2.2.2]octane, 2,6,7-trimethyl-1-diazabicyclo[2.2.2]octane, 1,8-diazabicyclo[5.4.0]undecene, N,N-dimethylcyclohexylamine, pyridine, N-methylmorpholine, N,N,N',N'-tetramethylethylenediamine, N,N,N',N'-tetramethyl-1,3-butanediamine, N,N,N',N'-pentamethyldiethylenetriamine, N,N,N',N'-tetra(3-dimethylaminopropyl)-methanediamine, N,N'-dimethylpiperazine and 1,2-dimethylimidazole; and trialkylphosphine compounds such as tri-n-butylphosphine, tri-n-hexylphosphine, tricyclohexylphosphine and tri-n-octylphosphine.

Of these, dibutyltin dilaurate and tin octanoate are preferable in that the reaction is facilitated with a small amount of the catalyst and the catalyst has high selectivity for the iso(thio)cyanate compound (B). When the catalyst is used, the additive amount thereof is preferably 0.001 to 0.5% by weight, more preferably 0.002 to 0.3% by weight, still more preferably 0.01 to 0.3% by weight, yet still more preferably 0.01 to 0.2% by weight, and particularly preferably 0.05 to 0.2% by weight per 100% by weight in total of the thiol compound (A), the iso(thio)cyanate compound (B), and the hydroxy (meth)acrylate compound (C). If the additive amount is below the lower limit, the catalytic effect is decreased, which may cause a significantly long reaction time. If the additive amount is above the upper limit, the catalytic effect is excessively increased, so that a large amount of reaction heat is generated, which sometimes makes it difficult to control the temperature. The catalyst may be added in the whole amount at the initiation of the reaction, or may be added successively or in portions to the reaction system as required. Such successive or portionwise addition of the catalyst prevents the generation of an excessively large amount of reaction heat at the initial stage of the reaction and thus facilitates the control of the reaction temperature.

The reaction temperature is not particularly limited, but is preferably 0 to 120° C., more preferably 20 to 100° C., and still more preferably 50 to 90° C. When the reaction is carried out at a temperature below the lower limit, the reaction rate is markedly decreased and the reaction requires a very long time to complete or may not complete in some cases. On the other hand, when the reaction is carried out at a temperature above the upper limit, side reactions may generate impurities. Such impurities sometimes cause the coloration of the (meth)acrylate (D) which is the produced.

From the viewpoint of stable production in the above-described preferred range of temperatures, it is preferable that the reaction temperature is controlled. The reaction between the mercapto group and the iso(thio)cyanato group and the reaction between the hydroxy group and the iso(thio)cyanato group are usually exothermic. When the reaction generates a large amount of heat and the temperature of the reaction product may be elevated above the preferred range of the reaction temperature, cooling is sometimes performed. When the reaction has substantially completed and the temperature of the reaction product may be decreased below the preferred range of the reaction temperature, heating is sometimes performed.

The (meth)acrylate (D) has polymerization activity. Thus, an unintended polymerization reaction may proceed when the system is subjected to a high temperature during the production of the (meth)acrylate (D). To prevent such unintended polymerization reaction, a known polymerization inhibitor may be added before the initiation of the reaction or during the reaction.

The polymerization inhibitor is not particularly limited as long as the inhibitor can suppress the reaction of acrylate groups in production of the (meth)acrylate (D). Examples thereof include dibutylhydroxytoluene (BHT), hydroquinone (HQ), hydroquinone monomethyl ether (MEHQ) and phenothiazine (PTZ). Of these polymerization inhibitors, BHT is particularly preferable because the consumption of the inhibitor by the reaction with the isocyanate groups is small as compared to other phenolic polymerization inhibitors and also because the coloration encountered with amine polymerization inhibitors is small.

The amount of the polymerization inhibitor to be added is not particularly limited, but is preferably 0.001 to 0.5% by weight, more preferably 0.002 to 0.3% by weight, still more preferably 0.005 to 0.3% by weight, yet still more preferably 0.005 to 0.1% by weight, and further preferably 0.01 to 0.1% by weight per 100 parts by weight in total of the thiol compound (A), the iso(thio)cyanate compound (B), and the hydroxy (meth)acrylate compound (C). If the additive amount is below the lower limit, the polymerization inhibitor may fail to perform as expected. If the additive amount is above the upper limit, a monomer composition containing a (meth)acrylate (D) to be used, for example, a dental material monomer composition may exhibit a markedly low curing rate to cause a limited practical applicability.

A solvent may be used in the reaction of the thiol compound (A), the iso(thio)cyanate compound (B), and the hydroxy (meth)acrylate compound (C). The solvent is not particularly limited as long as the solvent does not have practical reactivity with the thiol compound (A), the iso(thio)cyanate compound (B), and the hydroxy (meth)acrylate compound (C), does not inhibit the reaction, and can dissolve the raw materials and the product. The reaction may be performed without using solvents. The thiol compound (A) and the hydroxy (meth)acrylate compound (C) are usually low viscous liquid and are miscible with the iso(thio)cyanate compound (B) to allow the reaction to take place without using solvents.

In the reaction of the thiol compound (A), the iso(thio)cyanate compound (B), and the hydroxy (meth)acrylate compound (C), a ratio (a/b) of a number of moles of the mercapto groups of the thiol compound (A), a, to a number of moles of the iso(thio)cyanato groups of the iso(thio)cyanate compound (B), b, is preferably 0.01 to 0.20, and more preferably 0.01 to 0.18.

A ratio ((a+c)/b) of the total number of moles (a+c) of the number of moles of the mercapto groups in the thiol compound (A), a, and the number of moles of active hydrogen groups in the hydroxy (meth)acrylate compound (C), c, to the number of moles of the iso(thio)cyanato groups in the iso(thio)cyanate compound (B), b, is preferably 0.70 to 1.30, more preferably 0.70 to 1.20, and still more preferably 0.90 to 1.10.

By satisfying the ratio of the numbers of moles, a (meth)acrylate (D) which can provide a cured product having excellent heat resistance, solvent resistance, and shock resistance can be more suitably obtained. The monomer composition containing such a (meth)acrylate (D) is suitable as the dental material composition.

A method for admixing the thiol compound (A), the iso(thio)cyanate compound (B), and the hydroxy (meth)acrylate compound (C) with one another to produce a (meth)acrylate (D) is not particularly limited.

Examples thereof include a method for adding an admixed product of a thiol compound (A) and a hydroxy (meth)acrylate compound (C) to an iso(thio)cyanate compound (B) in a reaction vessel while controlling a discharged amount of the admixed product, followed by admixing the compounds to produce a (meth)acrylate (D), a method for adding a thiol compound (A) to an iso(thio)cyanate compound (B) in a reaction vessel while controlling a discharged amount of the thiol compound (A), followed by admixing the compounds to prepare an intermediate, and thereafter adding a hydroxy (meth)acrylate compound (C) to the intermediate while controlling a discharged amount of the hydroxy (meth)acrylate compound (C), followed by admixing the compounds to produce a (meth)acrylate (D), and a method for simultaneously adding a thiol compound (A), an iso(thio)cyanate compound (B), and a hydroxy (meth)acrylate compound (C) to a reaction vessel while controlling discharged amounts of the compounds, followed by admixing the compounds to produce a (meth)acrylate (D).

According to the producing method of the (meth)acrylate (D) due to admixing, the amount of heat generated by the reaction between the mercapto group and the iso(thio)cyanato group and the reaction between the hydroxy group and the iso(thio)cyanato group can be controlled in an appropriate range, and thus the temperature control during the reaction is facilitated. There can also be employed a method for adding the whole amounts of the thiol compound (A), the iso(thio)cyanate compound (B), and the hydroxy (meth)acrylate compound (C) to a reaction vessel, and thereafter increasing the temperature, to react the compounds, thereby producing the (meth)acrylate (D). During the reaction, the reaction temperature is sometimes sharply increased due to reaction heat and the temperature control by cooling may be appropriately required.

The method for producing the (meth)acrylate (D) is preferably a producing method by way of an intermediate, for example, the method for reacting the thiol compound (A) and the iso(thio)cyanate compound (B) with each other to obtain the intermediate, and thereafter adding the hydroxy (meth)acrylate compound (C) to the intermediate, followed by mixing to produce the (meth)acrylate (D), from the viewpoints of reactivity of raw materials and pot life of the obtained (meth)acrylate (D).

A method for producing a (meth)acrylate (D) or a monomer composition containing the (meth)acrylate (D) preferably includes the steps of (i) reacting a thiol compound (A) and an iso(thio)cyanate compound (B) with each other to obtain an intermediate, and (ii) reacting the intermediate and a hydroxy (meth)acrylate compound (C) with each other in the case of the producing method by way of an intermediate. Hereinafter, the steps will be described.

[Step (i)]

In the step (i), a predetermined amount of the thiol compound (A) is collectively added or dividedly added to the iso(thio)cyanate compound (B) for the reaction. A ratio (a/b) of the number of moles of the mercapto groups of the thiol compound (A), a, to the number of moles of the iso(thio)cyanato groups of the iso(thio)cyanate compound (B), b, is preferably 0.01 to 0.20, and more preferably 0.01 to 0.18.

If the thiol compound (A), the iso(thio)cyanate compound (B), and the hydroxy (meth)acrylate compound (C) are collectively mixed, reaction heat is increased, so that an unexpected polymerization reaction of the (meth)acrylate may proceed. As with the step (i), the (meth)acrylate (D) obtained by reacting the thiol compound (A) and the iso(thio)cyanate compound (B) with each other to obtain the intermediate, and thereafter reacting the intermediate and the hydroxy (meth)acrylate compound (C) with each other can suitably provide a resin molded body having excellent heat resistance, solvent resistance, and shock resistance.

The reaction between the thiol compound (A) and the iso(thio)cyanate compound (B) may be performed under presence of an additive. The reaction temperature is different depending on the kinds and amounts of the compound and additive to be used, and the aspect of the produced intermediate, and is not generally limited. The reaction temperature is appropriately selected in consideration of handling properties, safety, convenience and the like.

[Step (ii)]

In the step (ii), the hydroxy (meth)acrylate compound (C) is reacted with the intermediate obtained in the step (i). The (meth)acrylate (D) or the monomer composition containing the (meth)acrylate (D) can be obtained by the reaction. In the step (ii), the reaction is usually performed by adding the hydroxy (meth)acrylate compound (C) to the intermediate, followed by mixing. The reaction temperature is different depending on the compound to be used, and is not generally limited. The reaction temperature is appropriately selected in consideration of handling properties, safety, convenience and the like, and is preferably 90° C. or lower. Heating may be performed depending on the solubility of the compound to be used. The heating temperature is determined in consideration of the stability and safety of the compound.

When an iso(thio)cyanate compound (B) and a hydroxy (meth)acrylate compound (C) are temporarily reacted with each other to obtain an intermediate, and the intermediate and a thiol compound (A) are subsequently reacted with each other to produce a (meth)acrylate (D), an ene-thiol reaction between a (meth)acrylate group in the intermediate and a mercapto group in the thiol compound (A) may proceed.

On the other hand, according to the producing method of the (meth)acrylate (D) including the steps (i) and (ii), the thiol compound (A) and the iso(thio)cyanate compound (B) are reacted with each other in the mole ratio a/b of the above-described range in the step (i) to obtain the intermediate, and the mercapto groups of the thiol compound (A) hardly remain. This tends to cause no problem in that the above-described ene-thiol reaction proceeds.

Oxygen is effective as a polymerization inhibitor for a compound containing an acryloyl group and a methacryloyl group. Thus, oxygen is sometimes introduced into the reactor to prevent unintended polymerization of the acryloyl group and the methacryloyl group during the reaction. For example, oxygen may be introduced into the reactor in such a form as dried air or oxygen gas. Preferably, oxygen is introduced into the reactor in the form of dried air. For example, the dried air may be obtained by removing water using a known drying method such as the use of a condensing air dryer. In another aspect, a mixed gas containing oxygen and an inert gas such as nitrogen may be introduced into the reactor. The aspect of such a mixed gas containing oxygen and an inert gas such as nitrogen is preferred similarly to the aspect of the dried air. The mixed gas containing oxygen and an inert gas such as nitrogen may be obtained by mixing oxygen gas or the dried air containing oxygen with a predetermined ratio of nitrogen. Nitrogen is preferably one that has been dehydrated by a known drying method. The method for the introduction is not particularly limited. For example, the gas may be continuously or intermittently introduced in the form of bubbles from the bottom of the reaction vessel. The gas may be continuously or intermittently introduced to the space at the top of the reaction vessel. The introduction amount of dry air may be appropriately set in accordance with the size and the like of the reaction container. For example, in the case of a 1-L volume reaction container, the introduction amount is usually 1 to 500 ml/min, and preferably 1 to 300 ml/min. At less than 1 ml/min, oxygen cannot be introduced in a sufficient amount and may fail to serve effectively as a polymerization inhibitor. Adding oxygen in excess of 500 ml/min increases the volatilization of the iso(thio)cyanate compound (B) during the reaction, which may result in a decrease in properties of a cured product of the (meth)acrylate (D).

If water is present as an impurity in the system during the reaction of the thiol compound (A), the iso(thio)cyanate compound (B), and the hydroxy (meth)acrylate compound (C), the iso(thio)cyanate compound (B) and the water may react with each other, which may result in formation of impurities having a higher molecular weight than that of an object. An increase in the amount of impurities causes an increase in the viscosity of a product material, which is not preferred. Thus, it is preferable that as little water as possible is present in the reaction system during the reaction of the thiol compound (A), the iso(thio)cyanate compound (B) and the hydroxy (meth)acrylate compound (C).

Therefore, the amount of water contained in the thiol compound (A) and the hydroxy (meth)acrylate compound (C) is preferably as small as possible. Specifically, the amount of water is preferably 0.5% by weight or less, more preferably 0.3% by weight or less, and still more preferably 0.1% by weight or less based on the total amount of the thiol compound (A) and the hydroxy (meth)acrylate compound (C). When the thiol compound (A) and the hydroxy (meth)acrylate compound (C) contain water in an amount exceeding the upper limit, it is preferable that the compound is used as a raw material for the (meth)acrylate (D) after water is removed therefrom by a known method. The reaction vessel used in order to produce the (meth)acrylate (D) is preferably dried by a known method to remove water therefrom.

The (meth)acrylate (D) such as the (meth)acrylate represented by the general formula (1) is preferably liquid at room temperature. The viscosity of the (meth)acrylate (D) at 65° C. is preferably 1 to 50000 mPa·s, more preferably 1 to 20000 mPa·s, and still more preferably 1 to 5000 mPa·s. When the viscosity of the (meth)acrylate (D) is in this range, the monomer composition containing the (meth)acrylate (D) exhibits a low viscosity to provide an advantage in the preparation of a dental material composition. The (meth)acrylate (D) sometimes contains minor components other than the desired (meth)acrylate (D), such as oligomers partially formed during storage at high temperatures and highly viscous byproduct compounds, and a mixture with the minor components. However, the presence of such minor components tends to be an insignificant problem in the use as a monomer composition or a dental material composition even if these mixtures are used as long as the viscosity of the (meth)acrylate (D) is in the above-described range. The viscosity is a value measured at 65° C. with an E-type viscosimeter (for example, TVE-22H manufactured by TOKI SANGYO CO., LTD.).

These (meth)acrylate (D) may be used singly, or two or more thereof may be used. For example, when a thiol compound (A), an iso(thio)cyanate compound (B), and two or more hydroxy acrylate compounds (C) are used as raw materials to produce a (meth)acrylate (D), or when a thiol compound (A), an iso(thio)cyanate compound (B), a hydroxy acrylate compound (C), and a hydroxy methacrylate compound (C) are used as raw materials to produce a (meth)acrylate (D), two or more (meth)acrylates (D) are contained in a monomer composition.

<<Monomer Composition>>

The monomer composition of the present invention contains the (meth)acrylate (D). The monomer composition is preferably a dental material monomer composition. A molded body can be obtained by curing the monomer composition of the present invention, or by mixing the monomer composition with other component, followed by curing the mixture.

[Polymerizable Compound (E)]

The monomer composition in the present invention may further contain a polymerizable compound (E) containing at least one polymerizable group selected from a methacryloyl group and an acryloyl group (excluding a (meth)acrylate (D)) in addition to the (meth)acrylate (D).

The number of the polymerizable groups contained in the polymerizable compound (E) may be 1, or may be 2 or more. The number of the polymerizable groups is preferably 2 or more and 10 or less, more preferably 2 or more and 6 or less, and still more preferably 2 or more and 4 or less.

The molecular weight of the polymerizable compound (E) is preferably 80 to 1000, and more preferably 150 to 700. If the molecular weight is below this range, the compound has a low boiling point. Thus, the above lower limit is preferred from the viewpoint of handling properties in the preparation of a monomer composition. If the molecular weight is higher than the above range, the compound tends to exhibit a high viscosity. Thus, the above upper limit is preferred from the viewpoint of handling properties in the preparation of a monomer composition.

The polymerizable compound (E) is preferably liquid at room temperature. The viscosity of the polymerizable compound (E) at 65° C. is preferably 1 to 50000 mPa·s, more preferably 1 to 20000 mPa·s, still more preferably 1 to 5000 mPa·s, and particularly preferably 1 to 3000 mPa·s. When the viscosity of the polymerizable compound (E) is in this range, the monomer composition exhibits a low viscosity to provide an advantage in blending the monomer composition into the dental material composition. Furthermore, the viscosity of the polymerizable compound (E) at 65° C. is more preferably lower than the viscosity of the (meth)acrylate (D) at 65° C. The polymerizable compound (E) sometimes contains minor components other than the desired polymerizable compound (E), such as oligomers partially formed during storage at high temperatures, and a mixture with the minor components.

However, the presence of such minor components tends to be an insignificant problem in the use as a monomer composition or a dental material composition even if these mixtures are used as long as the viscosity of the polymerizable compound (E) is in the above-described range. The viscosity is a value measured at 65° C. with an E type viscometer.

These polymerizable compounds (E) may be used singly, or two or more thereof may be used.

Examples of the polymerizable compounds (E) having only one polymerizable group include polymerizable compounds represented by the following general formula (9).

[Chem. 9]

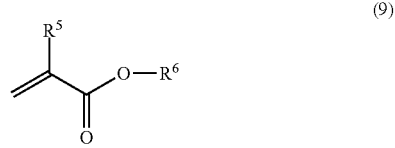

In the above-described general formula (9), $R^5$ is hydrogen or a methyl group, and $R^6$ represents a $C_{1-20}$ monovalent organic group which may contain oxygen or nitrogen.

Examples of the monovalent organic groups include hydrocarbon groups such as $C_{1-20}$ acyclic hydrocarbon groups, for example, an alkyl group, an alkenyl group, and an alkynyl group; $C_{1-20}$ cyclic hydrocarbon groups such as a cycloalkyl group, a cycloalkenyl group, a cycloalkynyl group, and an aryl group; and $C_{1-20}$ oxygen-containing hydrocarbon groups such as groups corresponding to the above hydrocarbon groups except that oxygen is introduced between at least part of the carbon atoms forming carbon-carbon bonds (but oxygen atoms are not inserted contiguously), for example, alkoxyalkyl groups, alkoxyalkylene glycol groups and tetrahydrofurfuryl groups. The $C_{1-20}$ cyclic hydrocarbon groups may have acyclic hydrocarbon moieties. The acyclic hydrocarbon moieties present in these groups may be linear or branched.

When the $C_{1-20}$ hydrocarbon groups or the $C_{1-20}$ oxygen-containing hydrocarbon groups contain linear alkylene moieties, at least one of the methylene groups in such moieties may be substituted with an ester bond, an amide bond, a carbonate bond, a urethane bond (a carbamoyl group) or a urea bond (but the methylene groups are not substituted contiguously).

Hydrogen atoms present in the organic groups such as the $C_{1-20}$ hydrocarbon group and the $C_{1-20}$ oxygen-containing hydrocarbon group may be substituted with acid groups such as carboxyl groups and phosphate groups, and functional groups such as hydroxyl groups, amino groups and epoxy groups.

Examples of the methacryloyl group-containing compounds represented by the general formula (9) include methyl methacrylate, ethyl methacrylate, propyl methacrylate, butyl methacrylate, hexyl methacrylate, cyclohexyl methacrylate, ethoxydiethylene glycol methacrylate, methoxytriethylene glycol methacrylate, phenoxyethyl methacrylate, 2-hydroxyethyl methacrylate, 2-hydroxypropyl methacrylate, 2-hydroxybutyl methacrylate, 2-hydroxy-3-phenoxypropyl methacrylate, 4-hydroxybutyl methacrylate and 1,4-cyclohexanedimethanol monomethacrylate.

Examples of the acryloyl group-containing compounds represented by the general formula (9) include methyl acrylate, ethyl acrylate, propyl acrylate, butyl acrylate, hexyl acrylate, cyclohexyl acrylate, ethoxydiethylene glycol acrylate, methoxytriethylene glycol acrylate, phenoxyethyl acrylate, 2-hydroxyethyl acrylate, 2-hydroxypropyl acrylate, 2-hydroxybutyl acrylate, 2-hydroxy-3-phenoxypropyl acrylate, 4-hydroxybutyl acrylate and 1,4-cyclohexanedimethanol monoacrylate.

Examples of the polymerizable compound (E) having two or more polymerizable groups include polymerizable compounds represented by the following general formula (10).

[Chem. 10]

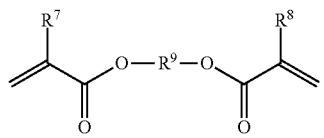

(10)

In the general formula (10), $R^7$ and $R^8$ each represent hydrogen or a methyl group and may be the same as or different from each other; and $R^9$ represents a $C_{1\text{-}40}$ divalent organic group which may contain oxygen or nitrogen. The (meth)acrylate (D) is not contained in the compound represented by the general formula (10).

Examples of the divalent organic groups include hydrocarbon groups, for example, $C_{1\text{-}40}$ acyclic hydrocarbon groups such as alkylene groups, alkenylene groups and alkynylene groups, and $C_{1\text{-}40}$ cyclic hydrocarbon groups such as cycloalkylene groups, cycloalkenylene groups, cycloalkynylene groups and arylene groups; and $C_{1\text{-}40}$ oxygen-containing hydrocarbon groups such as groups corresponding to the above hydrocarbon groups except that oxygen is introduced between at least part of the carbon atoms forming carbon-carbon bonds (but oxygen atoms are not inserted contiguously), for example, oxyalkylene groups. The $C_{1\text{-}40}$ cyclic hydrocarbon groups may have acyclic hydrocarbon moieties. The acyclic hydrocarbon moieties present in these groups may be linear or branched.

When the $C_{1\text{-}40}$ hydrocarbon groups or the $C_{1\text{-}40}$ oxygen-containing hydrocarbon groups contain linear alkylene moieties, at least one of the methylene groups in such moieties may be substituted with an ester bond, an amide bond, a carbonate bond, a urethane bond (a carbamoyl group) or a urea bond (but the methylene groups are not substituted contiguously).

Hydrogen atoms present in the organic groups such as the $C_{1\text{-}40}$ hydrocarbon groups and the $C_{1\text{-}40}$ oxygen-containing hydrocarbon groups may be substituted with acid groups such as carboxyl groups and phosphate groups, functional groups such as hydroxyl groups, amino groups and epoxy groups, and polymerizable groups such as acryloyl groups and methacryloyl groups.

Among the polymerizable compounds represented by the general formula (10), a suitable example of the polymerizable compounds is a polymerizable compound in which $R^9$ is a linear alkylene group having 2 to 20 carbon atoms, and desirably 4 to 12 carbon atoms.

Examples of the methacryloyl group-containing compounds which correspond to the above suitable polymerizable compounds include 1,4-butanediol dimethacrylate, 1,6-hexanediol dimethacrylate, 1,8-octanediol dimethacrylate, 1,9-nonanediol dimethacrylate and 1,10-decanediol dimethacrylate.

Examples of the acryloyl group-containing compounds which correspond to the above suitable polymerizable compounds include 1,4-butanediol diacrylate, 1,6-hexanediol diacrylate, 1,8-octanediol diacrylate, 1,9-nonanediol diacrylate and 1,10-decanediol diacrylate.

Among the polymerizable compounds represented by the general formula (10), other suitable polymerizable compounds are polymerizable compounds in which $R^9$ is a linear oxyalkylene group having 2 to 20 carbon atoms, and desirably 4 to 12 carbon atoms.

Examples of the methacryloyl group-containing compounds which correspond to the above suitable polymerizable compounds include ethylene glycol dimethacrylate, diethylene glycol dimethacrylate, triethylene glycol dimethacrylate, tetraethylene glycol dimethacrylate, polyethylene glycol dimethacrylate, tripropylene glycol dimethacrylate, tetrapropylene glycol dimethacrylate and polypropylene glycol dimethacrylate.

Examples of the acryloyl group-containing compounds which correspond to the above suitable polymerizable compounds include ethylene glycol diacrylate, diethylene glycol diacrylate, triethylene glycol diacrylate, tetraethylene glycol diacrylate, polyethylene glycol diacrylate, tripropylene glycol diacrylate, tetrapropylene glycol diacrylate and polypropylene glycol diacrylate.

Furthermore, among the polymerizable compounds represented by the general formula (10), other suitable polymerizable compounds are carbamoyl group-containing polymerizable compounds represented by the following general formula (11). The (meth)acrylate (D) is not contained in the compounds represented by the following general formula (11).

[Chem. 11]

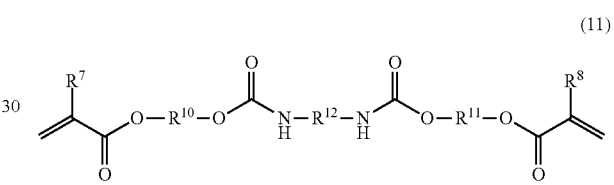

(11)

In the general formula (11), $R^7$ and $R^8$ each are hydrogen or a methyl group and may be the same as or different from each other; and $R^{10}$ and $R^{11}$ each are a $C_{1\text{-}12}$ divalent organic group which may contain oxygen, and may be the same as or different from each other.

Examples of the divalent organic groups include hydrocarbon groups, for example, $C_{1\text{-}12}$ acyclic hydrocarbon groups such as alkylene groups, and $C_{1\text{-}12}$ cyclic hydrocarbon groups such as cycloalkylene groups and arylene groups; and $C_{1\text{-}12}$ oxygen-containing hydrocarbon groups such as groups corresponding to the above hydrocarbon groups except that oxygen is introduced between at least part of the carbon atoms forming carbon-carbon bonds (but oxygen atoms are not inserted contiguously), for example, oxyalkylene groups. The $C_{1\text{-}12}$ cyclic hydrocarbon groups may have acyclic hydrocarbon moieties. The acyclic hydrocarbon moieties present in these groups may be linear or branched.

Hydrogen atoms present in the organic groups such as the $C_{1\text{-}12}$ hydrocarbon groups and the $C_{1\text{-}12}$ oxygen-containing hydrocarbon groups may be substituted with acid groups such as carboxyl groups and phosphate groups, functional groups such as hydroxyl groups, amino groups and epoxy groups, and polymerizable groups such as acryloyl groups and methacryloyl groups.

In the general formula (11), $R^{12}$ represents a $C_{1\text{-}20}$ divalent organic group which may contain oxygen. Examples of the divalent organic groups include hydrocarbon groups, for example, $C_{1\text{-}20}$ acyclic hydrocarbon groups such as alkylene groups; and $C_{1\text{-}20}$ oxygen-containing hydrocarbon groups such as groups corresponding to the above hydrocarbon groups except that oxygen is introduced between at least part of the carbon atoms forming carbon-carbon bonds (but oxygen atoms are not inserted contiguously), for example, oxyalkylene groups. The $C_{1-20}$ cyclic hydrocarbon groups may have acyclic hydrocarbon moieties. The acyclic hydrocarbon moieties present in these groups may be linear or branched.

Hydrogen atoms present in the organic groups such as the $C_{1-20}$ hydrocarbon groups and the $C_{1-20}$ oxygen-containing hydrocarbon groups may be substituted with acid groups such as carboxyl groups and phosphate groups, and functional groups such as hydroxyl groups, amino groups and epoxy groups.

Examples of the methacryloyl group-containing compounds represented by the general formula (11) include urethane methacrylates formed by the reaction between a hydroxymethacrylate such as 2-hydroxyethyl methacrylate, 2-hydroxypropyl methacrylate, 2-hydroxybutyl methacrylate, 2-hydroxy-3-phenoxypropyl methacrylate, 4-hydroxybutyl methacrylate or 1,4-cyclohexanedimethanol monomethacrylate, and a diisocyanate such as 2,4- or 2,6-toluene diisocyanate, 4,4'-, 2,4'- or 2,2'-diphenylmethane-diisocyanate, 1,6-hexamethylene diisocyanate, or 2,2,4- or 2,4,4-trimethyl-1,6-hexamethylene-diisocyanate. Examples of such urethane methacrylates include 2,2,4-trimethylhexamethylene bis(2-carbamoyloxyethyl)dimethacrylate (UDMA).

Examples of the acryloyl group-containing compounds represented by the general formula (11) include urethane acrylates formed by the reaction between a hydroxyacrylate such as 2-hydroxyethyl acrylate, 2-hydroxypropyl acrylate, 2-hydroxybutyl acrylate, 2-hydroxy-3-phenoxypropyl acrylate, 4-hydroxybutyl acrylate or 1,4-cyclohexanedimethanol monoacrylate, and a diisocyanate such as 2,4- or 2,6-toluene diisocyanate, 4,4'-, 2,4'- or 2,2'-diphenylmethane-diisocyanate, 1,6-hexamethylene diisocyanate, or 2,2,4- or 2,4,4-trimethyl-1,6-hexamethylene-diisocyanate. Examples of such urethane acrylates include 2,2,4-trimethylhexamethylene bis(2-carbamoyloxyethyl)diacrylate.

Another preferred examples of the polymerizable compound represented by the general formula (10) include polymerizable compounds represented by the following general formula (12).

[Chem. 12]

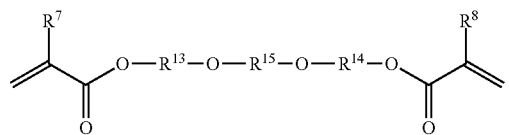

(12)

In the general formula (12), $R^7$ and $R^8$ each represent hydrogen or a methyl group and may be the same as or different from each other; and $R^{13}$ and $R^{14}$ each represent a $C_{1-12}$ divalent organic group which may contain oxygen, and may be the same as or different from each other.

Examples of the divalent organic groups include hydrocarbon groups, for example, $C_{1-12}$ acyclic hydrocarbon groups such as alkylene groups, and $C_{1-12}$ cyclic hydrocarbon groups such as cycloalkylene groups and arylene groups; and $C_{1-12}$ oxygen-containing hydrocarbon groups such as groups corresponding to the above hydrocarbon groups except that oxygen is introduced between at least part of the carbon atoms forming carbon-carbon bonds (but oxygen atoms are not inserted contiguously), for example, oxyalkylene groups. The $C_{1-12}$ cyclic hydrocarbon groups may have acyclic hydrocarbon moieties. The acyclic hydrocarbon moieties present in these groups may be linear or branched.

Hydrogen atoms present in the organic groups such as the $C_{1-12}$ hydrocarbon groups and the $C_{1-12}$ oxygen-containing hydrocarbon groups may be substituted with acid groups such as carboxyl groups and phosphate groups, functional groups such as hydroxyl groups, amino groups and epoxy groups, and polymerizable groups such as acryloyl groups and methacryloyl groups.

In the general formula (12), $R^{15}$ represents a $C_{1-20}$ divalent organic group which may contain oxygen.

Examples of the divalent organic groups include $C_{1-20}$ hydrocarbon groups such as alkylene groups, cycloalkylene groups and arylene groups; and $C_{1-20}$ oxygen-containing hydrocarbon groups such as groups corresponding to the above hydrocarbon groups except that oxygen is introduced between at least part of the carbon atoms forming carbon-carbon bonds (but oxygen atoms are not inserted contiguously), for example, oxyalkylene groups. The $C_{1-20}$ cyclic hydrocarbon groups may have acyclic hydrocarbon moieties.

Hydrogen atoms present in the organic groups such as the $C_{1-20}$ hydrocarbon groups and the $C_{1-20}$ oxygen-containing hydrocarbon groups may be substituted with acid groups such as carboxyl groups and phosphate groups, and functional groups such as hydroxyl groups, amino groups and epoxy groups.

Examples of the methacryloyl group-containing compounds represented by the general formula (12) include 2,2-bis[4-(3-methacryloyloxy-2-hydroxypropoxy)phenyl]propane (Bis-GMA), ethylene oxide-modified bisphenol A dimethacrylate and propylene oxide-modified bisphenol A dimethacrylate.

Examples of the acryloyl group-containing compounds represented by the general formula (12) include 2,2-bis[4-(3-acryloyloxy-2-hydroxypropoxy)phenyl]propane, ethylene oxide-modified bisphenol A diacrylate and propylene oxide-modified bisphenol A diacrylate.

When the monomer composition of the present invention is used in such an application as dental adhesive materials, it is preferable that the monomer composition contain, as the polymerizable compound (E), a polymerizable compound exhibiting a bonding function. Examples of the polymerizable compound (E) exhibiting a bonding function include polymerizable compounds having at least one polymerizable group selected from methacryloyl groups and acryloyl groups, and an acidic group. Examples of the acidic groups include phosphate residues, pyrophosphate residues, thiophosphate residues, carboxylate residues and sulfonate residues.

Examples of the polymerizable compounds having a methacryloyl group and a phosphate residue include 2-methacryloyloxyethyl dihydrogen phosphate, 9-methacryloyloxynonyl dihydrogen phosphate, 10-methacryloyloxydecyl dihydrogen phosphate, 11-methacryloyloxyundecyl dihydrogen phosphate, 20-methacryloyloxyeicosyl dihydrogen phosphate, 1,3-dimethacryloyloxypropyl-2-dihydrogen phosphate, 2-methacryloyloxyethyl phenyl phosphoric acid, 2-methacryloyloxyethyl 2'-bromoethyl phosphoric acid, methacryloyloxyethyl phenyl phosphonate, and acid chlorides of these compounds.

Examples of the polymerizable compounds having an acryloyl group and a phosphate residue include 2-acryloyloxyethyl dihydrogen phosphate, 9-acryloyloxynonyl dihydrogen phosphate, 10-acryloyloxydecyl dihydrogen phosphate, 11-acryloyloxyundecyl dihydrogen phosphate, 20-acryloyloxyeicosyl dihydrogen phosphate, 1,3-diacryloyloxypropyl-2-dihydrogen phosphate, 2-acryloyloxyethyl phenyl phosphoric acid, 2-acryloyloxyethyl 2'-bromoethyl phosphoric acid, acryloyloxyethyl phenyl phosphonate, and acid chlorides of these compounds.

Examples of the polymerizable compounds having a methacryloyl group and a pyrophosphate residue include di(2-methacryloyloxyethyl) pyrophosphate, and acid chlorides thereof.

Examples of the polymerizable compounds having an acryloyl group and a pyrophosphate residue include di(2-acryloyloxyethyl) pyrophosphate, and acid chlorides thereof.

Examples of the polymerizable compounds having a methacryloyl group and a thiophosphate residue include 2-methacryloyloxyethyl dihydrogen dithiophosphate, 10-methacryloyloxydecyl dihydrogen thiophosphate, and acid chlorides of these compounds.

Examples of the polymerizable compounds having an acryloyl group and a thiophosphate residue include 2-acryloyloxyethyl dihydrogen dithiophosphate, 10-acryloyloxydecyl dihydrogen thiophosphate, and acid chlorides of these compounds.

Examples of the polymerizable compounds having a methacryloyl group and a carboxylate residue include 4-methacryloyloxyethoxycarbonylphthalic acid, 5-methacryloylaminopentylcarboxylic acid, 11-methacryloyloxy-1,1-undecanedicarboxylic acid, and acid chlorides and acid anhydrides of these compounds.

Examples of the polymerizable compounds having an acryloyl group and a carboxylate residue include 4-acryloyloxyethoxycarbonylphthalic acid, 5-acryloylaminopentylcarboxylic acid, 11-acryloyloxy-1,1-undecanedicarboxylic acid, and acid chlorides and acid anhydrides of these compounds.

Examples of the polymerizable compounds having a methacryloyl group and a sulfonate residue include 2-sulfoethyl methacrylate and 2-methacrylamido-2-methylpropanesulfonic acid.

Examples of the polymerizable compounds having an acryloyl group and a sulfonate residue include 2-sulfoethyl acrylate and 2-acrylamido-2-methylpropanesulfonic acid.

The monomer composition of the present invention may contain an acidic group-containing polymerizable compound which is not categorized into the polymerizable compounds (E). Examples of such acidic group-containing polymerizable compounds include sulfonate residue-containing polymerizable compounds such as styrenesulfonic acid. The acidic group-containing polymerizable compounds may be used singly, or two or more may be used in combination.

The amount of the (meth)acrylate (D) in 100% by weight of the monomer composition of the present invention is different depending on the applications and the like, and can be appropriately set. The amount of the (meth)acrylate (D) is usually 50 to 100% by weight, and preferably 60 to 90% by weight. The amount of the polymerizable compound (E) in 100% by weight of the monomer composition of the present invention is usually 0 to 60% by weight, and preferably 10 to 40% by weight.

When the monomer composition of the present invention contains such an acidic group-containing polymerizable compound, the amount of the acidic group-containing polymerizable compound to be added is not particularly limited. Usually, the monomer composition contains the acidic group-containing polymerizable compound in such an amount that the number of the polymerizable groups present in the acidic group-containing polymerizable compound is 50% or less relative to the total number of the polymerizable groups in the monomer composition.

The viscosity of the monomer composition of the present invention is not particularly limited, but is preferably in the range of 1 to 100000 mPa·s at 65° C., more preferably in the range of 5 to 60000 mPa·s, still more preferably in the range of 10 to 30000 mPa·s, and yet still more preferably in the range of 100 to 10000 mPa·s. If the viscosity is above the upper limit, when a component such as a filler is added to the monomer composition to produce the dental material composition of the present invention, the dispersibility thereof becomes poor, which may make it difficult to obtain a uniform mixture. If, on the other hand, the viscosity is less than the lower limit, when a component such as a filler is mixed to the monomer composition to produce the dental material composition of the present invention, an increased amount of air bubbles enter the composition, which may make it difficult to obtain a uniform mixture. The monomer composition is sometimes partially oligomerized during storage at high temperatures. The viscosity is a value immediately after the production of the monomer composition before the occurrence of any oligomerization.

The hue of the monomer composition in the present invention is not particularly limited, but is preferably suited for use as a raw material for dental materials. Specifically, the APHA scale is preferably 500 or less, more preferably 200 or less, and still more preferably 100 or less.

In the production of the monomer composition of the present invention, a method in which the (meth)acrylate (D) and the polymerizable compound (E) are mixed together is not particularly limited. For example, the monomer composition of the present invention is obtained by adding the (meth)acrylate (D) and the polymerizable compound (E) into a container and stirring the mixture to uniformity while performing heating appropriately.

In order to provide an enhancement in storage stability, the monomer composition of the present invention may contain the polymerization inhibitor described above. The inhibitor may be added during the synthesis of the (meth)acrylate (D) as described above, or may be added during a downstream step as required.

The monomer composition of the present invention has room-temperature polymerizability, thermal polymerizability or photopolymerizability when a polymerization initiator to be described later is added thereto. A molded body (cured product) is obtained by curing the monomer composition. The cured product of the molded body (cured product) obtained by curing the monomer composition of the present invention has high mechanical properties as compared with the molded body (cured product) obtained by curing the conventional monomer composition, and particularly has both high breaking strength and high breaking energy in a balanced manner. In other words, the cured product is a material having both toughness and rigidity.

The monomer composition of the present invention may contain additives such as a bactericidal agent, a disinfectant, a stabilizer, and a preserving agent as required as long as the advantageous effects of the present invention are not impaired.

<<Dental Material Composition>>

The monomer composition of the present invention can be suitably used as components of the dental material composition of the present invention, and the dental material composition contains the above-described monomer composition, polymerization initiator, and filler. The dental material composition has room-temperature polymerizability, thermal polymerizability, or photopolymerizability, and can be suitably used as dental restorative materials, for example.

The amount of the monomer composition to be added is usually in the range of 20 to 80% by weight, and preferably in the range of 20 to 50% by weight per 100% by weight of the dental material composition.

The polymerization initiator to be used may be any of general polymerization initiators used in the dental field, and is usually selected in consideration of the polymerizability of the polymerizable compounds contained in the dental material composition, and the polymerization conditions.

In the case of room-temperature polymerization, for example, a redox polymerization initiator which is a combination of an oxidant and a reductant is suitable. When using a redox polymerization initiator, an oxidant and a reductant which are separately packaged need to be mixed with each other immediately before use.

The oxidants are not particularly limited. Examples thereof include organic peroxides such as diacyl peroxides, peroxy esters, dialkyl peroxides, peroxyketals, ketone peroxides and hydroperoxides. Examples of the organic peroxides include diacyl peroxides such as benzoyl peroxide, 2,4-dichlorobenzoyl peroxide and m-toluoyl peroxide; peroxy esters such as t-butyl peroxybenzoate, bis-t-butyl peroxyisophthalate, 2,5-dimethyl-2,5-bis(benzoylperoxy)hexane, t-butyl peroxy-2-ethylhexanoate and t-butyl peroxyisopropyl carbonate; dialkyl peroxides such as dicumyl peroxide, di-t-butyl peroxide and lauroyl peroxide; peroxyketals such as 1,1-bis(t-butylperoxy)-3,3,5-trimethylcyclohexane; ketone peroxides such as methyl ethyl ketone peroxide; and hydroperoxides such as t-butyl hydroperoxide.

The reductants are not particularly limited, but tertiary amines are usually used. Examples of the tertiary amines include N,N-dimethylaniline, N,N-dimethyl-p-toluidine, N,N-dimethyl-m-toluidine, N,N-diethyl-p-toluidine, N,N-dimethyl-3,5-dimethylaniline, N,N-dimethyl-3,4-dimethylaniline, N,N-dimethyl-4-ethylaniline, N,N-dimethyl-4-i-propylaniline, N,N-dimethyl-4-t-butylaniline, N,N-dimethyl-3,5-di-t-butylaniline, N,N-bis(2-hydroxyethyl)-p-toluidine, N,N-bis(2-hydroxyethyl)-3,5-dimethylaniline, N,N-bis(2-hydroxyethyl)-3,4-dimethylaniline, N,N-bis(2-hydroxyethyl)-4-ethylaniline, N,N-bis(2-hydroxyethyl)-4-i-propylaniline, N,N-bis(2-hydroxyethyl)-4-t-butylaniline, N,N-di(2-hydroxyethyl)-3,5-di-i-propylaniline, N,N-bis(2-hydroxyethyl)-3,5-di-t-butylaniline, ethyl 4-dimethylaminobenzoate, n-butoxyethyl 4-dimethylaminobenzoate, (2-methacryloyloxy)ethyl 4-dimethylaminobenzoate, trimethylamine, triethylamine, N-methyldiethanolamine, N-ethyldiethanolamine, N-n-butyldiethanolamine, N-lauryldiethanolamine, triethanolamine, (2-dimethylamino)ethyl methacrylate, N,N-bis(methacryloyloxyethyl)-N-methylamine, N,N-bis(methacryloyloxyethyl)-N-ethylamine, N,N-bis(2-hydroxyethyl)-N-methacryloyloxyethylamine, N,N-bis(methacryloyloxyethyl)-N-(2-hydroxyethyl)amine and tris(methacryloyloxyethyl)amine.

Besides these organic peroxide/amine systems, redox polymerization initiators such as cumene hydroperoxide/thiourea systems, ascorbic acid/$Cu^{2+}$ salt systems and organic peroxide/amine/sulfinic acid (or sulfinate salt) systems may be used. Polymerization initiators such as tributyl borane and organic sulfinic acids are also suitably used.

In the case of thermal polymerization with heating, it is preferable to use peroxides or azo compounds.

The peroxides are not particularly limited, and examples thereof include benzoyl peroxide, t-butyl hydroperoxide and cumene hydroperoxide. The azo compounds are not particularly limited, and examples thereof include azobisisobutyronitrile.

In the case of photopolymerization with the irradiation of visible lights, preferred initiators are redox initiators such as α-diketones/tertiary amines, α-diketones/aldehydes and α-diketones/mercaptans.

Examples of the photopolymerization initiators include, but are not particularly limited to, α-diketones/reductants, ketals/reductants and thioxanthones/reductants. Examples of the α-diketones include camphorquinone, benzil and 2,3-pentanedione. Examples of the ketals include benzyl dimethyl ketal and benzyl diethyl ketal. Examples of the thioxanthones include 2-chlorothioxanthone and 2,4-diethylthioxanthone. Examples of the reductants include tertiary amines such as Michler's ketone, 2-(dimethylamino)ethyl methacrylate, N,N-bis[(meth)acryloyloxyethyl]-N-methylamine, ethyl N,N-dimethylaminobenzoate, butyl 4-dimethylaminobenzoate, butoxyethyl 4-dimethylaminobenzoate, N-methyldiethanolamine, 4-dimethylaminobenzophenone, N,N-bis(2-hydroxyethyl)-p-toluidine and dimethylaminophenanthrol; aldehydes such as citronellal, lauryl aldehyde, phthalic dialdehyde, dimethylaminobenzaldehyde and terephthalaldehyde; and thiol group-containing compounds such as 2-mercaptobenzoxazole, decanethiol, 3-mercaptopropyltrimethoxysilane, 4-mercaptoacetophenone, thiosalicylic acid and thiobenzoic acid. α-diketone/organic peroxide/reductant systems obtained by adding organic peroxides to these redox systems are suitably used.

In the case of photopolymerization with the irradiation of UV lights, suitable initiators are benzoin alkyl ethers and benzyl dimethyl ketal. Photopolymerization initiators such as (bis)acylphosphine oxides are also suitably used.

Of the (bis)acylphosphine oxides, examples of the acylphosphine oxides include 2,4,6-trimethylbenzoyldiphenylphosphine oxide, 2,6-dimethoxybenzoyldiphenylphosphine oxide, 2,6-dichlorobenzoyldiphenylphosphine oxide, 2,4,6-trimethylbenzoylmethoxyphenylphosphine oxide, 2,4,6-trimethylbenzoylethoxyphenylphosphine oxide, 2,3,5,6-tetramethylbenzoyldiphenylphosphine oxide and benzoyldi-(2,6-dimethylphenyl)phosphonate. Examples of the bisacylphosphine oxides include bis-(2,6-dichlorobenzoyl)phenylphosphine oxide, bis-(2,6-dichlorobenzoyl)-2,5-dimethylphenylphosphine oxide, bis-(2,6-dichlorobenzoyl)-4-propylphenylphosphine oxide, bis-(2,6-dichlorobenzoyl)-1-naphthylphosphine oxide, bis-(2,6-dimethoxybenzoyl)phenylphosphine oxide, bis-(2,6-dimethoxybenzoyl)-2,4,4-trimethylpentylphosphine oxide, bis-(2,6-dimethoxybenzoyl)-2,5-dimethylphenylphosphine oxide, bis-(2,4,6-trimethylbenzoyl)phenylphosphine oxide and (2,5,6-trimethylbenzoyl)-2,4,4-trimethylpentylphosphine oxide. These (bis)acylphosphine oxide photopolymerization initiators may be used singly or in combination with various reductants such as amines, aldehydes, mercaptans and sulfinate salts. These reductants may be suitably used also in combination with the visible light photopolymerization initiators.

The polymerization initiators may be used singly, or two or more thereof may be used. The amount of the polymerization initiator to be added is usually in the range of 0.01 to 20% by weight, and preferably 0.1 to 5% by weight per 100% by weight of the dental material composition.

The filler to be used may be any of general fillers used in the dental field. The fillers are usually broadly categorized into organic fillers and inorganic fillers.

Examples of the organic fillers include fine powders of polymethyl methacrylate, polyethyl methacrylate, methyl methacrylate-ethyl methacrylate copolymer, crosslinked polymethyl methacrylate, crosslinked polyethyl methacrylate, ethylene-vinyl acetate copolymer and styrene-butadiene copolymer.

Examples of the inorganic fillers include fine powders of various glasses (based on silicon dioxide and optionally containing oxides of, for example, heavy metals, boron and aluminum), various ceramics, diatomaceous earth, kaolin, clay minerals (such as montmorillonite), activated clay, synthetic zeolite, mica, calcium fluoride, ytterbium fluoride, calcium phosphate, barium sulfate, zirconium dioxide, titanium dioxide and hydroxyapatite. Specific examples of the inorganic fillers include barium borosilicate glasses (such as Kimble Raysorb T3000, Schott 8235, Schott GM27884 and Schott GM39923), strontium boroaluminosilicate glasses (such as Raysorb T4000, Schott G018-093 and Schott GM32087), lanthanum glasses (such as Schott GM31684), fluoroaluminosilicate glasses (such as Schott G018-091 and Schott G018-117), and boroaluminosilicate glasses containing zirconium and/or cesium (such as Schott G018-307, G018-308 and G018-310).

An organic inorganic composite filler may be used which is obtained by adding a polymerizable compound beforehand to the inorganic filler to provide a paste, which is then cured by polymerization and crushed.

In an aspect of the dental material composition, the composition containing a microfiller having a particle diameter of 0.1 μm or less is suitable as a dental composite resin. Preferred examples of the materials for fillers having a small particle diameter include silica (for example, product name: AEROSIL), alumina, zirconia and titania. The addition of such an inorganic filler having a small particle diameter is advantageous in order for a cured product of the composite resin to achieve high polishing smoothness.

These fillers may be surface treated with agents such as silane coupling agents in accordance with purposes. Examples of such surface treating agents to be used include known silane coupling agents, for example, organosilicon compounds such as γ-methacryloxyalkyltrimethoxysilanes (the number of carbon atoms between the methacryloxy group and the silicon atom: 3 to 12), γ-methacryloxyalkyltriethoxysilanes (the number of carbon atoms between the methacryloxy group and the silicon atom: 3 to 12), vinyltrimethoxysilane, vinylethoxysilane and vinyltriacetoxysilane. The concentration of the surface treating agent is usually in the range of 0.1 to 20% by weight, and preferably 1 to 10% by weight per 100% by weight of the filler.

The fillers may be used singly, or two or more thereof may be used. The amount of the filler to be added may be determined appropriately in consideration of handling properties (viscosity) of the dental material composition (for example, the composite resin paste) and mechanical properties of cured products of the paste. The amount is usually 10 to 2000 parts by weight, preferably 50 to 1000 parts by weight, and more preferably 100 to 600 parts by weight per 100 parts by weight of all the components contained in the dental material composition except the filler.

The dental material composition of the present invention may appropriately contain components other than the monomer composition of the present invention, the polymerization initiator and the filler in accordance with the purpose. For example, the dental material composition may contain the above-described polymerization inhibitor for enhancing storage stability. To adjust the color tone, the dental material composition may contain known colorants such as pigments and dyes. Furthermore, the dental material composition may contain known reinforcing materials such as fibers to increase the strength of cured products.

The dental material composition of the present invention may be cured under appropriate conditions in accordance with the polymerization method of the above-described polymerization initiator. In the case where, for example, the dental material composition of the present invention contains a visible light photopolymerization initiator, a desired cured product may be obtained by shaping the dental material composition into a predetermined form, and then irradiating the dental material composition with visible light for a predetermined time using a known light irradiator. The conditions such as irradiation intensity and irradiation intensity may be changed appropriately in accordance with the curability of the dental material composition. The cured product which has been cured by the irradiation of light such as visible light may be heat treated under more appropriate conditions, and thereby the mechanical properties of the cured product can be enhanced.

The dental material of the present invention is obtained by, for example, a method for producing a dental material, including the steps of: injecting the above-described dental material composition into a casting mold; and polymerizing and curing the dental material composition in the casting mold.

The cured product of the dental material composition of the present invention which is obtained as described above may be suitably used as the dental material.

The use method of the dental material composition of the present invention is not particularly limited as long as it is generally known as the use method of the dental material. When, for example, the dental material composition of the present invention is used as a composite resin for filling carious cavities, the purpose may be fulfilled by filling a cavity in the mouth with the dental material composition and photocuring the composition using a known light irradiator. When used as a crowning composite resin, the composition may be shaped into an appropriate form, photocured using a known light irradiator and heat treated under predetermined conditions to obtain a desired crown material.

The cured product of the dental material composition of the present invention including the monomer composition of the present invention has high mechanical properties as compared to cured products of conventional dental material compositions containing conventional monomer compositions, and in particular exhibit high flexural breaking strength. The detailed reasons as to why the cured products of the dental material compositions of the present invention have high mechanical properties are not fully understood. In the case of the dental material composition or in particular a composite resin as a typical example, the major proportion of the weight of the composition is accounted for by the monomer composition and the filler, and therefore these two components have a very high influence on the mechanical properties of the composite resin cured products. When the properties of an inorganic filler are compared with the properties of a cured product of the monomer composition, in general, the inorganic filler has a far higher strength than that of the cured product of the monomer composition. In contrast, the cured product of the monomer composition of the present invention has excellent flexibility. Thus, in the composite resin cured product, the inorganic filler may be considered as a hard segment component and the cured product as a soft segment component. In such a system, a blind increase in the rigidity of the soft segment component does not lead to an enhancement in the mechanical properties of the composite resin cured product or rather sometimes results in a hard but brittle material. As far as the soft segment component is concerned, it is considered that an increase in the toughness thereof while maintaining a certain level of rigidity will contribute to an enhancement in the mechanical properties of the composite resin cured product. When cured, the monomer composition of the present invention preferably contains a specific amount of the (meth) acrylate (D) to provide a material having both toughness and rigidity. It is presumed that such a cured product is suitable as the soft segment component in the composite resin cured product, and has high mechanical properties and, in particular, will exhibit high flexural breaking strength.

The dental material composition in the present invention may be suitably used as a dental material. Examples of such materials include dental restorative materials, denture base resins, denture base liners, impression materials, luting materials (resin cements, resin-modified glass ionomer cements), dental bonding materials (orthodontic bonding materials, cavity-coating bonding materials), dental fissure sealants, CAD/CAM resin blocks, temporary crowns and artificial tooth materials.

The dental material composition of the present invention may be preferably used also as a dental restorative material. The dental restorative materials are classified by application into categories such as dental crown composite resins, composite resins for filling carious cavities, composite resins for making dental abutments, and composite resins for filling restoration. The cured product of the dental material composition of the present invention exhibits high mechanical properties, and may be particularly preferably used as the dental crown composite resins.

EXAMPLES

Hereinafter, the present invention will be more specifically described based on Examples without limiting the scope of the present invention to such Examples.

The abbreviations of compounds used in Examples of the present invention will be shown below.

EBADMA (2.6): ethoxylated bisphenol A dimethacrylate (2.6EO modified)

UDMA: (2,2,4-trimethylhexamethylenebis(2-carbamoyloxyethyl)dimethacrylate) (manufactured by SARTOMER Company, Inc.)

HEA (also described as H1): 2-hydroxyethyl acrylate

HPA (also described as H2): 2-hydroxypropyl acrylate

HEMA (also described as H3): 2-hydroxyethyl methacrylate

NBDI (also described as I1): mixture of 2,5-bis(isocyanatomethyl)bicyclo[2.2.1]heptane and 2,6-bis(isocyanatomethyl)bicyclo[2.2.1]heptane XDI (also described as I2): m-xylylene diisocyanate TMXDI (also described as I3):
1,3-tetramethyl xylylene diisocyanate TMHDI (also described as I4):
2,2,4-trimethyl hexamethylene diisocyanate THIOL1 (also described as T1):
pentaerythritol tetrakis(3-mercaptopropionate)

THIOL2 (also described as T2):
4-mercaptomethyl-1,8-dimercapto-3,6-dithiaoctane

THIOL3 (also described as T3):
a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane DBTDL: dibutyltin dilaurate BHT: dibutylhydroxytoluene CQ: camphorquinone DMAB2-BE: 2-butoxyethyl 4-(dimethylamino)benzoate

[Method of Bending Test]

The bending test method in Examples and Comparative Examples of the present invention will be described below.
(Fabrication of Bending Test Pieces)

0.05 parts by weight of CQ and 0.05 parts by weight of DMAB2-BE were added into 10 parts by weight of a monomer composition from any of Examples and Comparative Examples. The mixture was stirred to uniformity at room temperature. Furthermore, to the solution, 15 parts by weight of silica glass (Fuselex-X (TATSUMORI LTD.)) was added. The mixture was stirred to uniformity using a mortar, followed by defoaming to prepare a dental material composition. The obtained dental material composition was added into a 2×2×25 mm stainless steel mold and was irradiated with light using a visible light irradiator (Solidilite V manufactured by SHOFU INC.) for 3 minutes on each side, namely, for a total of 6 minutes on both sides. Furthermore, the test piece was removed from the mold and was heat treated in an oven at 130° C. for 2 hours. The test piece was removed from the oven and was cooled to room temperature. Thereafter, the test piece was soaked in distilled water in a closable sample bottle and was stored at 37° C. for 24 hours. The test piece (bending test piece) thus obtained was used.
(Bending Test)

The test pieces fabricated in the above manners were subjected to a three-point bending test using a tester (AUTOGRAPH EZ-S manufactured by Shimadzu Corporation) under conditions in which a distance between supporting points was 20 mm and a cross head speed was 1 mm/min.
[Measuring Method of Viscosity]

In Examples and Comparative Examples, the viscosity was measured using an E type viscometer (TVE-22H manufactured by TOKI SANGYO CO., LTD.). The temperature was controlled at 65° C. using a circulation thermostatic tank.
[Measuring Method of Refractive Index]

In Examples and Comparative Examples, the refractive index was measured at a wavelength of 589.3 nm using an Abbe type full digital refractive index system (Abbemat 550 manufactured by AntonPaar). The temperature was controlled at 25° C.

Example 1

0.1 parts by weight of DBTDL, 0.05 parts by weight of BHT, 23.50 parts by weight of NBDI, and 0.84 parts by weight of THIOL1 were added into a thoroughly dried 100-mL four-necked flask equipped with a stirring blade and a thermometer, followed by dissolving to obtain a homogeneous solution. The homogeneous solution is reacted at 80° C. for 4 hours, to obtain a solution containing an intermediate. The solution was heated to 90° C. Furthermore, 25.66 parts by weight of HEA was added dropwise into the solution over a period of 1 hour. The dropwise addition was accompanied by an increase in inside temperature due to the reaction heat, and thus the amount of the dropwise addition was controlled so that the temperature did not exceed 90° C. After the whole amount had been added dropwise, the reaction was performed for 10 hours while the reaction temperature was kept at 90° C. During this process, the progress of the reaction was tracked by HPLC analysis to confirm the end point of the reaction. The product was discharged from the reactor. In this manner, 50 g of a composition containing a thiourethane acrylate (D-1)

((meth)acrylate (D-1)) was obtained. The composition had a viscosity of 1450 mPa·s at 65° C. The composition had a refractive index of 1.5071 at 25° C. 12.0 parts by weight of the obtained composition containing a thiourethane acrylate (D-1) and 3.0 parts by weight of EBADMA (2.6) were added into a container. The mixture was stirred to uniformity at 50° C. to obtain a monomer composition. When a dental material composition and a test piece (bending test piece) were obtained from the obtained monomer composition in accordance with the methods described in the paragraphs of (Fabrication of Bending Test Pieces) and (Bending Test), and the test piece was subjected to a bending test, the test piece had elastic modulus of 8.5 GPa, breaking strength of 211 MPa, and breaking energy of 42 mJ.

Examples 2 to 33

Compositions containing any of thiourethane acrylates (D-2) to (D-27), and thiourethane methacrylates (D-28) to (D-33) ((meth)acrylates (D-2) to (D-33)) were obtained in the same manner as in Example 1 except that components of kinds and amounts described in Tables 1 and 2 were used as a thiol compound (A), an iso(thio)cyanate compound (B), and a hydroxy (meth)acrylate compound (C) in Examples 2 to 33. Subsequent operation was performed in the same manner as in Example 1 using the compositions containing any of the (meth)acrylates (D-2) to (D-33), to obtain monomer compositions, dental material compositions, and test pieces.

The results are shown in Tables 1 and 2.

Comparative Example 1

0.012 parts by weight of CQ and 0.012 parts by weight of DMAB2-BE were added into 2.4 parts by weight of UDMA. The mixture was stirred to uniformity at room temperature. Furthermore, to the solution, 3.6 parts by weight of silica glass was added to obtain a dental material composition. When a cured product of the composition was subjected to a bending test, the cured product had elastic modulus of 5.9 GPa, breaking strength of 170 MPa, and breaking energy of 28 mJ.

TABLE 1

| | | Loading ratio | | | Properties of monomer | | Properties of cured body | | |
|---|---|---|---|---|---|---|---|---|---|
| | | Thiol compound (A) (pbW) | Iso(thio)cyanate compound (B) (pbW) | Hydroxy (meth)acrylate compound (C) (pbW) | SH/NCO *1 [mole ratio] | Viscosity [mPa · s] | Refractive index | Elastic modulus [GPa] | Breaking strength [MPa] | Breaking energy [mJ] |
| Examples | 1 | T1 0.84 | I1 23.50 | H1 25.66 | 0.03 | 1450 | 1.5071 | 8.5 | 211 | 42 |
| | 2 | T1 1.40 | I1 23.49 | H1 25.11 | 0.05 | 1900 | 1.5087 | 8.3 | 188 | 30 |
| | 3 | T1 2.78 | I1 23.45 | H1 23.77 | 0.1 | 4200 | 1.5123 | 8.2 | 186 | 32 |
| | 4 | T1 0.83 | I2 21.00 | H2 28.17 | 0.03 | 720 | 1.5170 | 8.6 | 191 | 32 |
| | 5 | T1 1.36 | I2 21.02 | H2 27.62 | 0.05 | 950 | 1.5190 | 8.4 | 200 | 36 |
| | 6 | T1 2.73 | I2 21.06 | H2 26.21 | 0.1 | 1840 | 1.5228 | 8.2 | 181 | 31 |
| | 7 | T1 0.78 | I3 25.61 | H1 23.61 | 0.03 | 2700 | 1.5179 | 8.5 | 188 | 34 |
| | 8 | T1 1.28 | I3 25.61 | H1 23.11 | 0.05 | 3400 | 1.5199 | 8.5 | 186 | 31 |
| | 9 | T1 2.56 | I3 25.57 | H1 21.87 | 0.1 | 6800 | 1.5235 | 8.2 | 180 | 30 |
| | 10 | T2 0.61 | I1 23.61 | H1 25.78 | 0.03 | 1240 | 1.5079 | 8.3 | 202 | 41 |
| | 11 | T2 1.00 | I1 23.67 | H1 25.33 | 0.05 | 1680 | 1.5098 | 8.8 | 203 | 43 |
| | 12 | T2 2.01 | I1 23.84 | H1 24.15 | 0.1 | 2900 | 1.5143 | 8.1 | 192 | 32 |
| | 13 | T2 0.60 | I2 21.10 | H2 28.30 | 0.03 | 590 | 1.5174 | 8.2 | 217 | 45 |
| | 14 | T2 0.98 | I2 21.18 | H2 27.84 | 0.05 | 680 | 1.5194 | 8.5 | 202 | 30 |
| | 15 | T2 1.98 | I2 21.39 | H2 26.63 | 0.1 | 1420 | 1.5235 | 8.6 | 204 | 33 |
| | 16 | T2 0.56 | I3 25.72 | H1 23.72 | 0.03 | 2100 | 1.5192 | 9.1 | 185 | 31 |
| | 17 | T2 0.93 | I3 25.61 | H1 23.28 | 0.05 | 2550 | 1.5208 | 9.0 | 197 | 35 |
| | 18 | T2 1.85 | I3 25.95 | H1 22.20 | 0.1 | 3990 | 1.5256 | 9.3 | 190 | 30 |

TABLE 2

| | | Loading ratio | | | | Properties of monomer | | Properties of cured body | | |
|---|---|---|---|---|---|---|---|---|---|---|
| | | Thiol compound (A) (pbW) | Iso(thio)cyanate compound (B) (pbW) | Hydroxy (meth)acrylate compound (C) (pbW) | SH/NCO *1 [mole ratio] | Viscosity [mPa · s] | Refractive index | Elastic modulus [GPa] | Breaking strength [MPa] | Breaking energy [mJ] |
| Examples | 19 | T3 0.64 | I1 23.59 | H1 25.77 | 0.03 | 1450 | 1.5085 | 8.4 | 200 | 44 |
| | 20 | T3 1.05 | I1 23.65 | H1 25.30 | 0.05 | 1840 | 1.5108 | 8.6 | 212 | 45 |
| | 21 | T3 2.12 | I1 23.78 | H2 24.10 | 0.1 | 3900 | 1.5162 | 8.2 | 184 | 30 |
| | 22 | T3 0.62 | I2 21.08 | H2 28.30 | 0.03 | 710 | 1.5186 | 8.1 | 188 | 32 |
| | 23 | T3 1.03 | I2 21.18 | H2 27.81 | 0.05 | 910 | 1.5211 | 8.5 | 208 | 35 |
| | 24 | T3 2.09 | I2 21.35 | H2 26.56 | 0.1 | 1790 | 1.5271 | 8.2 | 232 | 47 |
| | 25 | T3 0.58 | I3 25.71 | H1 23.71 | 0.03 | 2500 | 1.5198 | 9.2 | 190 | 30 |
| | 26 | T3 0.97 | I3 25.76 | H1 23.27 | 0.05 | 3300 | 1.5222 | 9.0 | 199 | 31 |
| | 27 | T3 1.95 | I3 25.90 | H1 22.15 | 0.1 | 6000 | 1.5271 | 9.2 | 185 | 30 |
| | 28 | T3 0.59 | I1 22.21 | H3 27.20 | 0.03 | 1140 | 1.5050 | 9.3 | 204 | 36 |
| | 29 | T3 0.99 | I1 22.29 | H3 26.72 | 0.05 | 1390 | 1.5071 | 9.3 | 193 | 31 |
| | 30 | T3 2.01 | I1 22.47 | H3 25.52 | 0.1 | 3000 | 1.5125 | 8.9 | 198 | 36 |
| | 31 | T3 0.59 | I4 22.45 | H3 26.96 | 0.03 | 210 | 1.4885 | 7.5 | 188 | 36 |
| | 32 | T3 0.99 | I4 22.52 | H3 26.49 | 0.05 | 260 | 1.4921 | 7.3 | 198 | 42 |
| | 33 | T3 1.99 | I4 22.71 | H3 25.30 | 0.1 | 410 | 1.4985 | 7.2 | 198 | 36 |
| Comparative Example | 1 | — | — | — | — | 170 | 1.4836 | 5.9 | 170 | 28 |

*1: Ratio (a/b) of number of moles of mercapto group of thiol compound (A), a, to number of moles of iso(thio)cyanato group of iso(thio)cyanate compound (B), b It is found that the breaking strength of the cured product of the dental material composition containing the monomer composition of the present invention is largely increased as compared with the cured product of the conventional dental material composition. That is, the use of the monomer composition of the present invention having both toughness and rigidity was shown to provide an increase in the breaking strength of the cured product of the dental material composition.

[Measuring Method of IR Spectrum]

The IR spectrum of the composition containing the thiourethane (meth)acrylate obtained in each of Examples 3, 6, 9, 12, 15, 18, 21, 24, 27, 30, and 33 was measured using a Fourier transform infrared spectroscopic analyzer Spectrum Two/UATR (Universal Attenuated Total Reflectance) manufactured by PerkinElmer Japan Co., Ltd.

Figure 2:
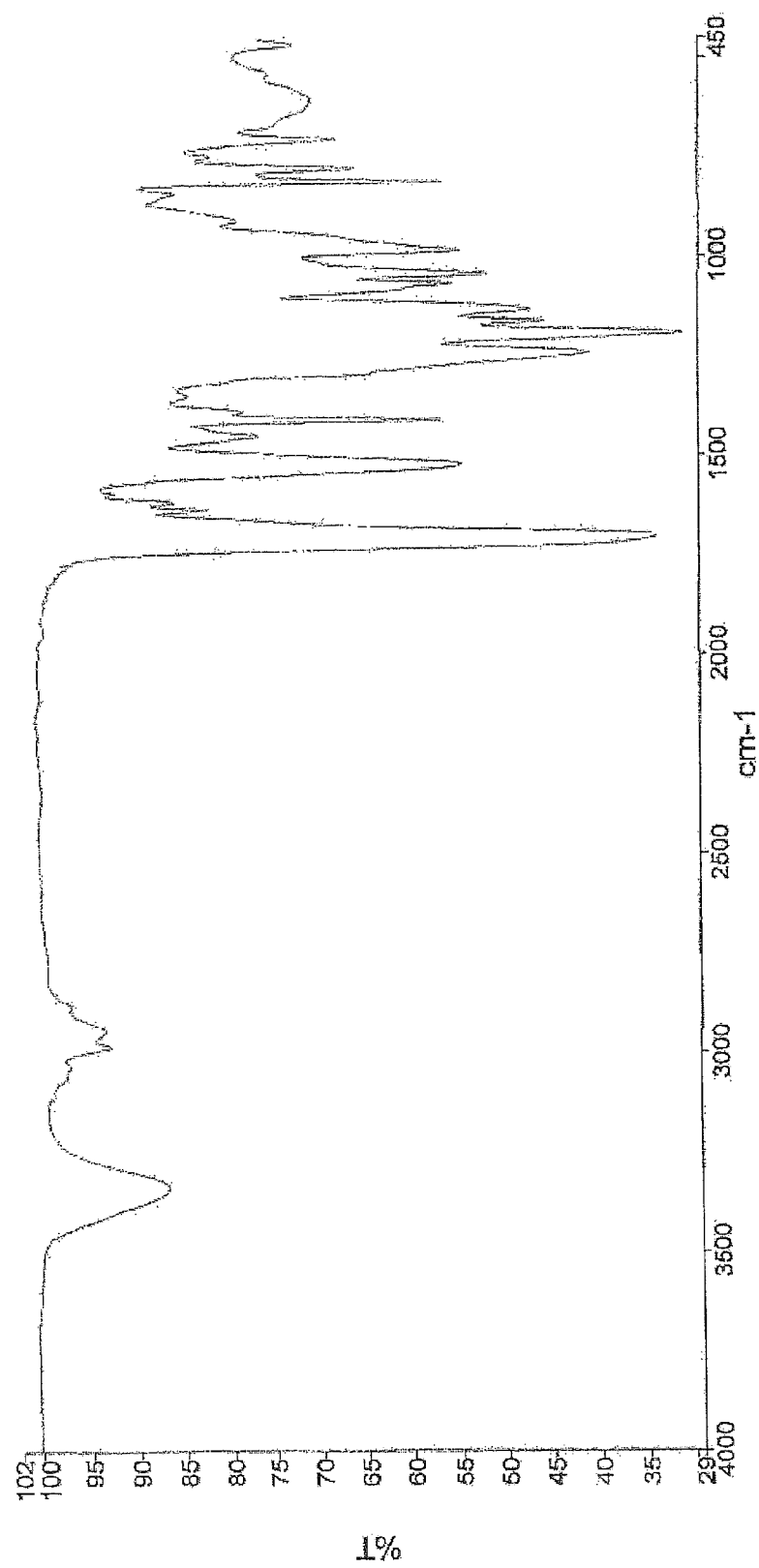
FIG. 2 shows an IR spectrum of a composition containing a thiourethane acrylate (D-6) obtained in Example 6.
Figure 3:
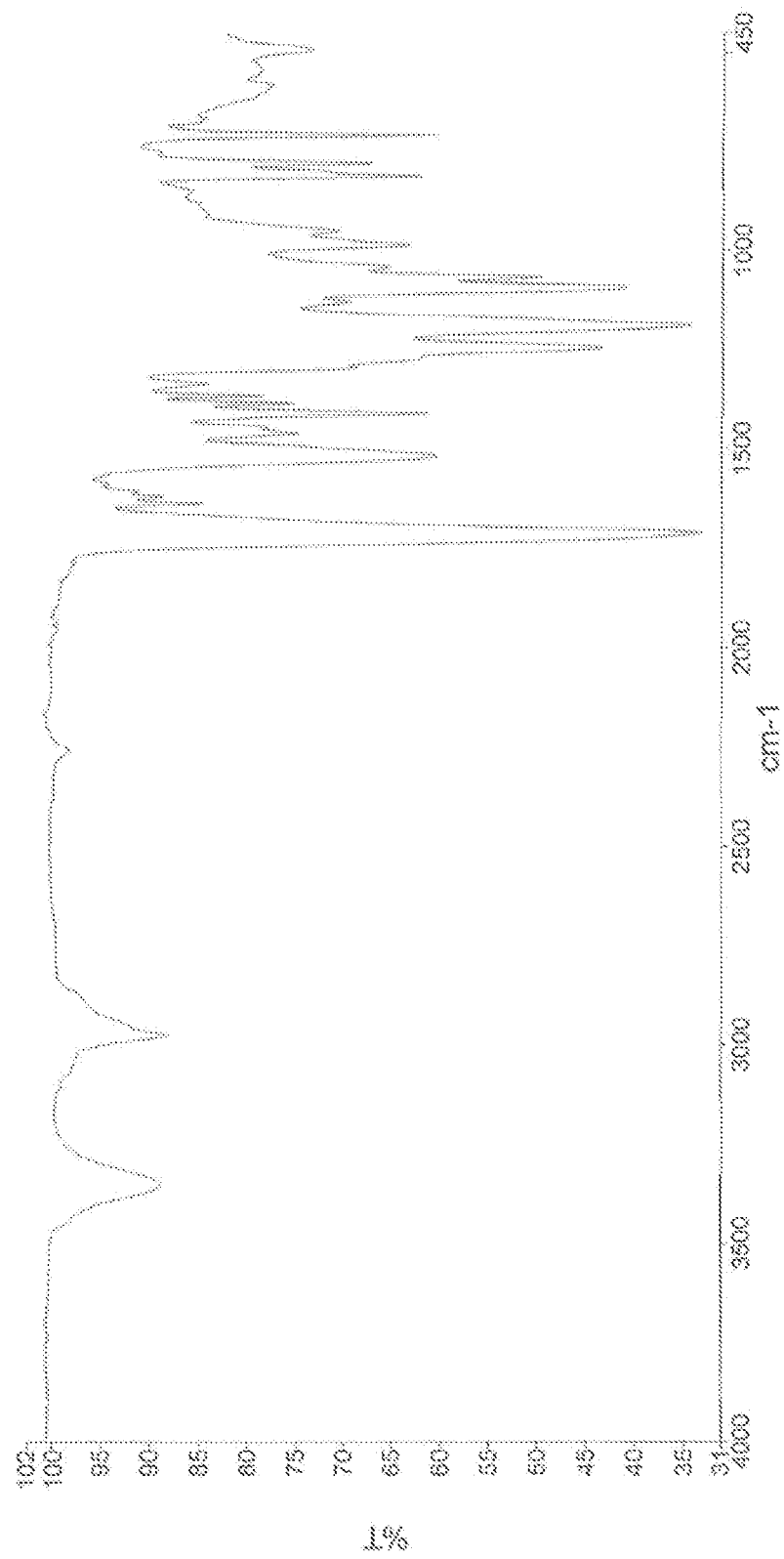
FIG. 3 shows an IR spectrum of a composition containing a thiourethane acrylate (D-9) obtained in Example 9.
Figure 4:
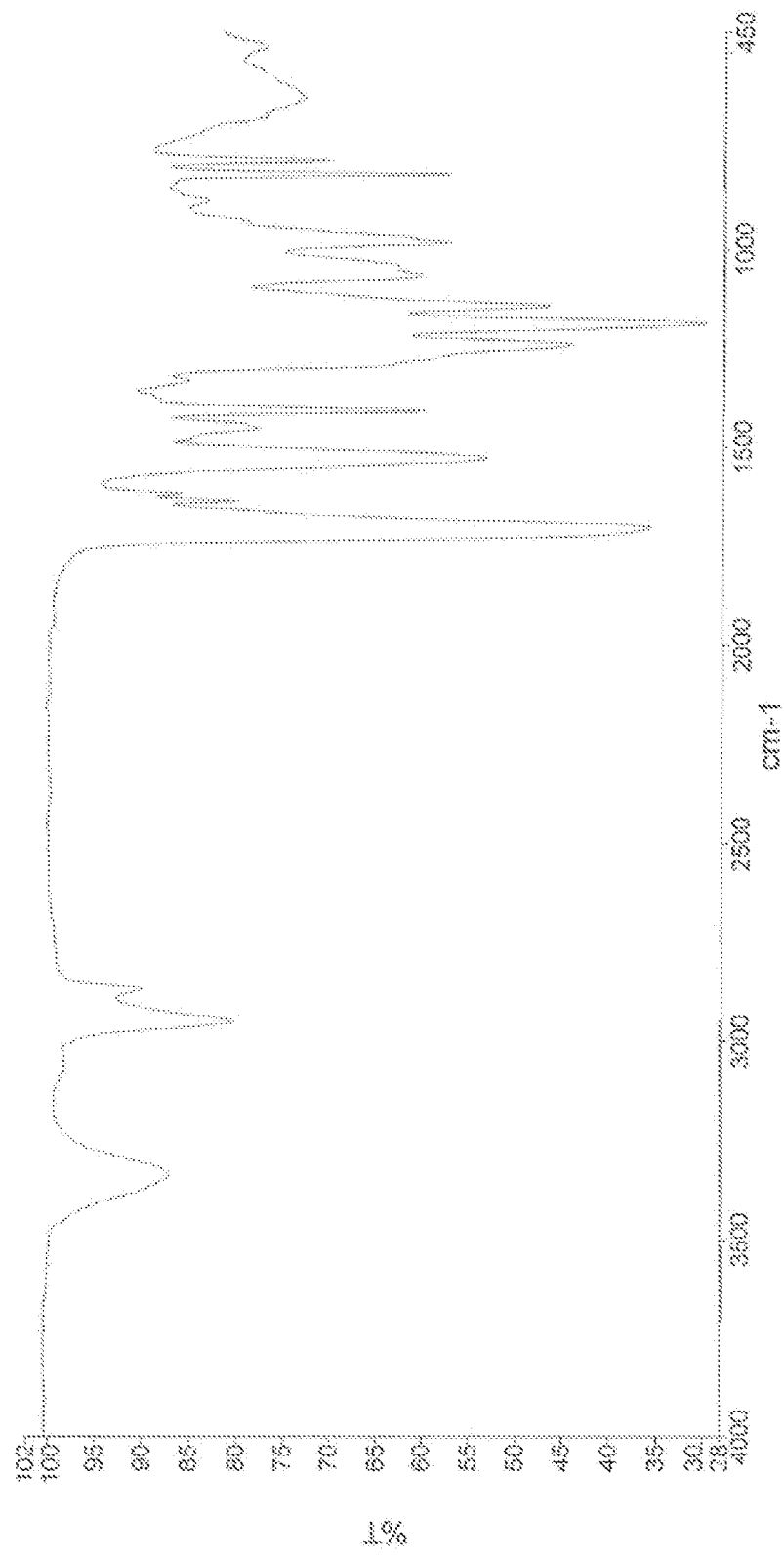
FIG. 4 shows an IR spectrum of a composition containing a thiourethane acrylate (D-12) obtained in Example 12.
Figure 5:
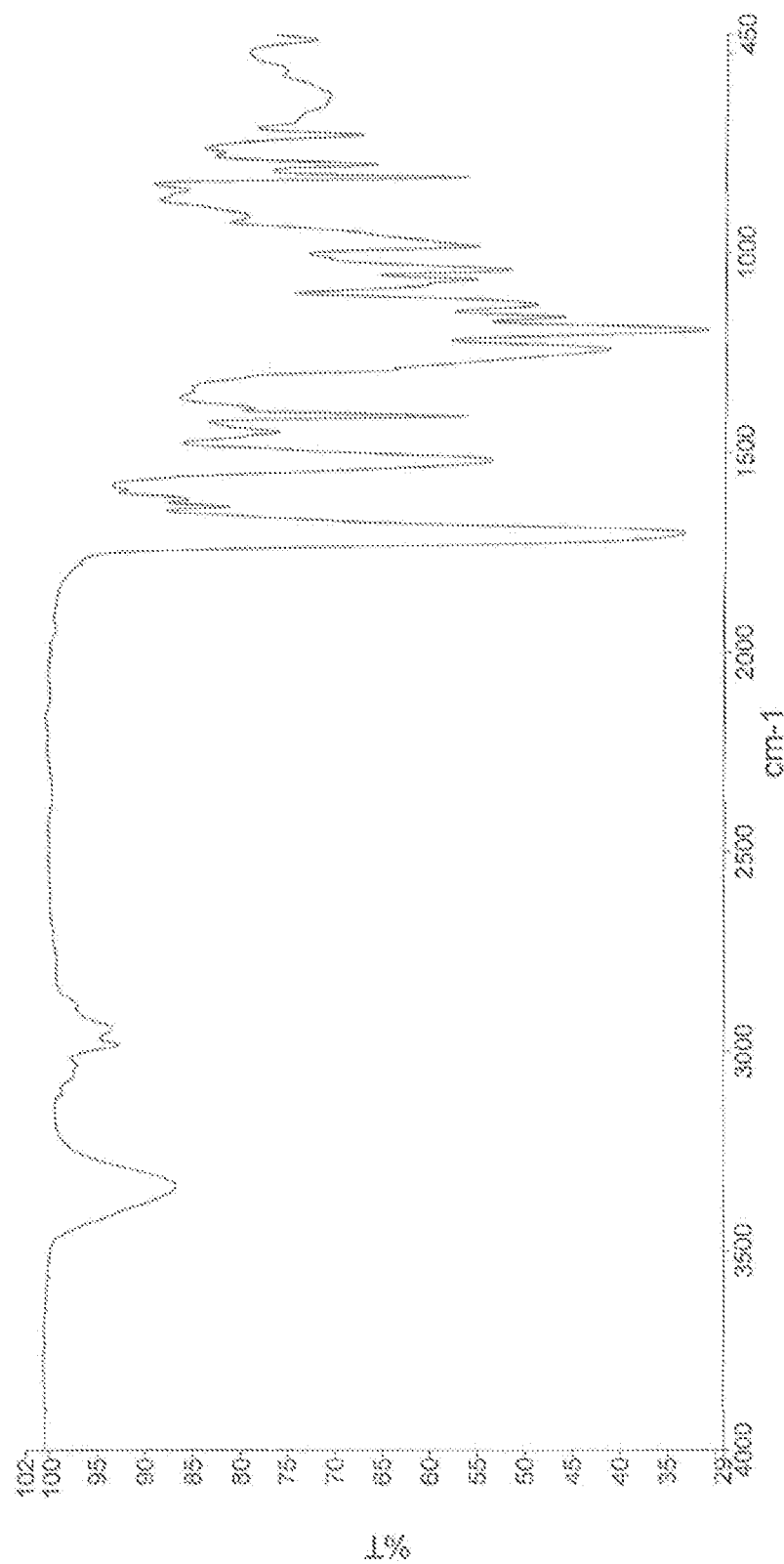
FIG. 5 shows an IR spectrum of a composition containing a thiourethane acrylate (D-15) obtained in Example 15.
Figure 6:
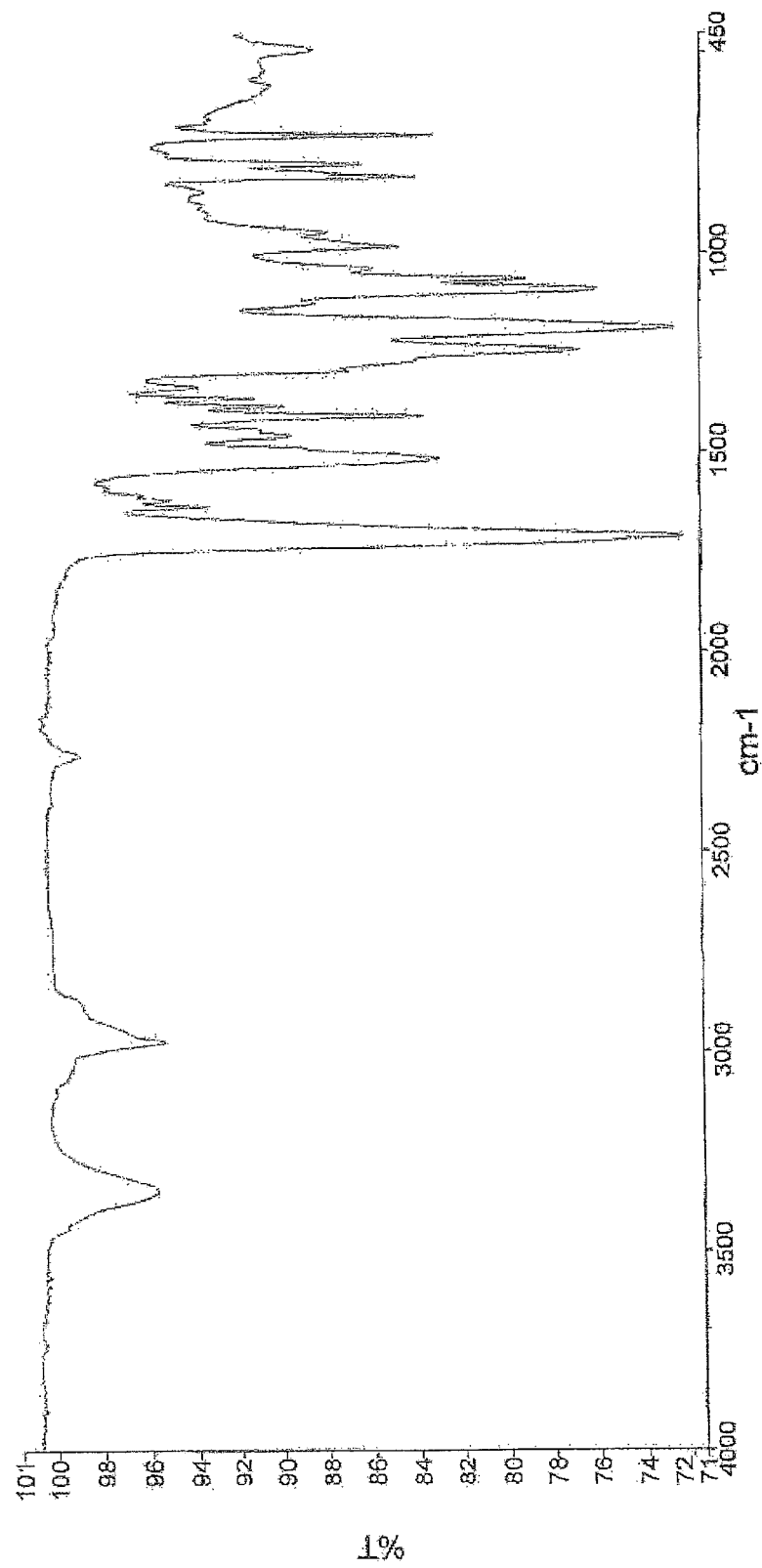
FIG. 6 shows an IR spectrum of a composition containing a thiourethane acrylate (D-18) obtained in Example 18.
Figure 7:
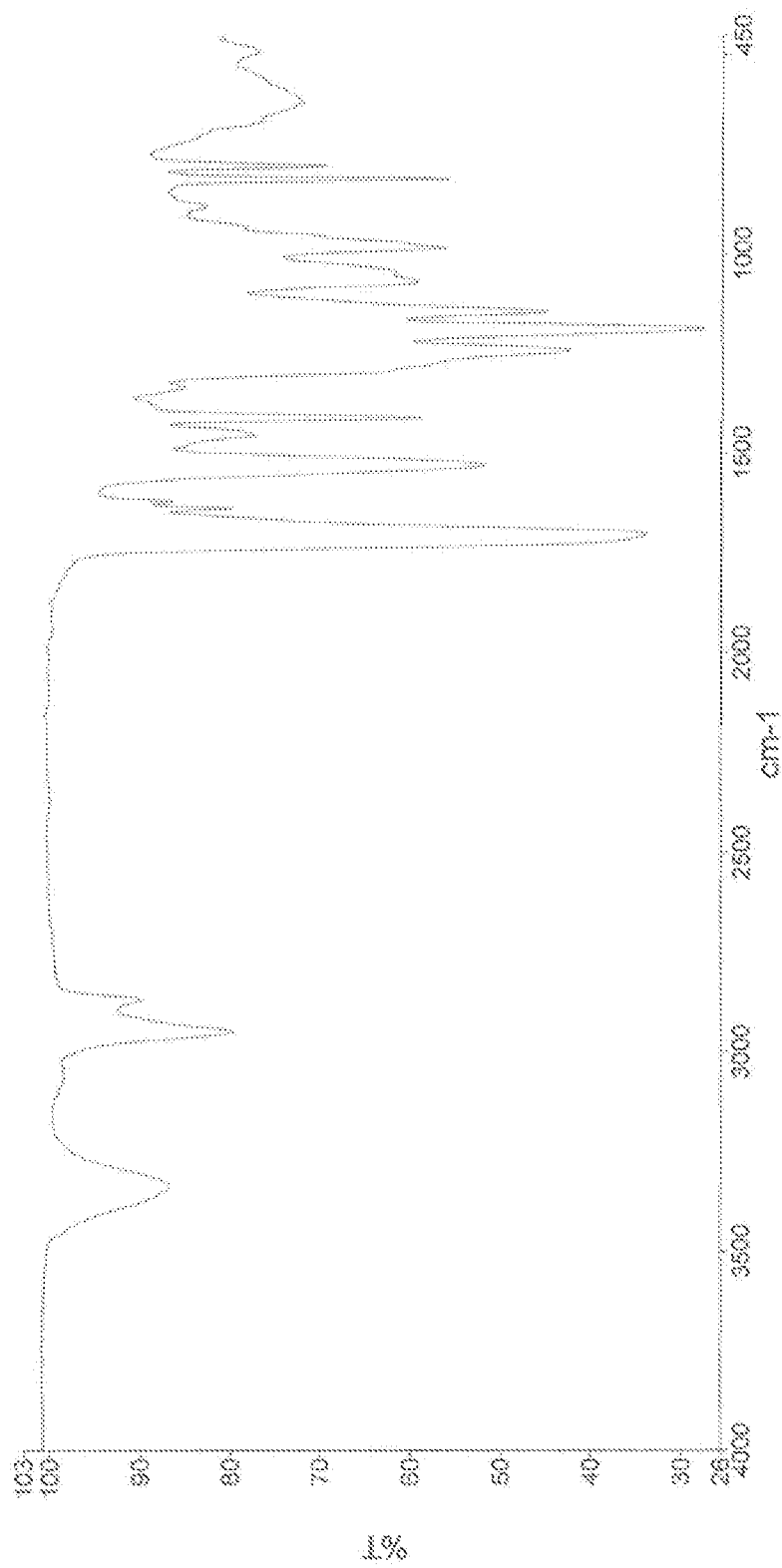
FIG. 7 shows an IR spectrum of a composition containing a thiourethane acrylate (D-21) obtained in Example 21.
Figure 8:
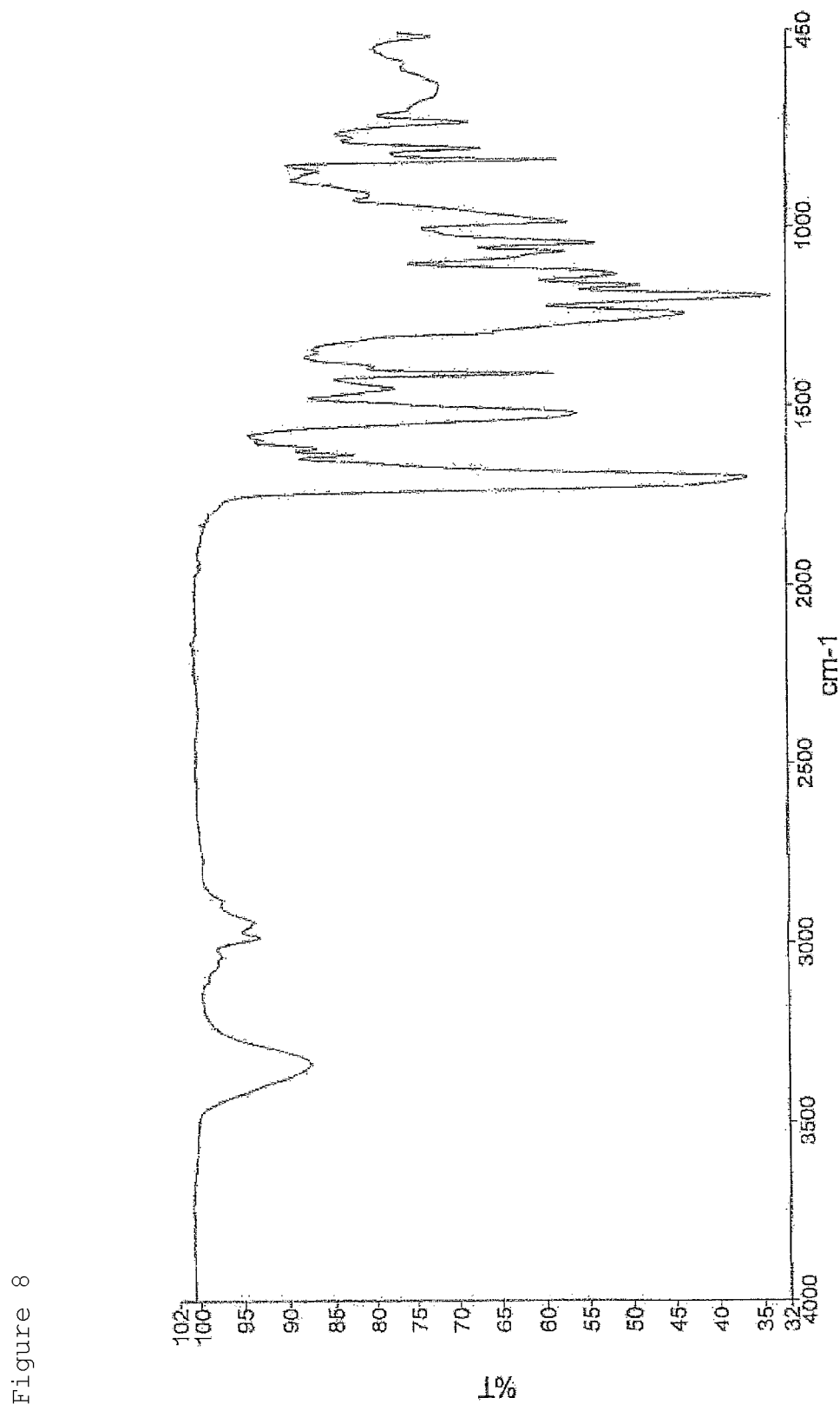
FIG. 8 shows an IR spectrum of a composition containing a thiourethane acrylate (D-24) obtained in Example 24.
Figure 9:
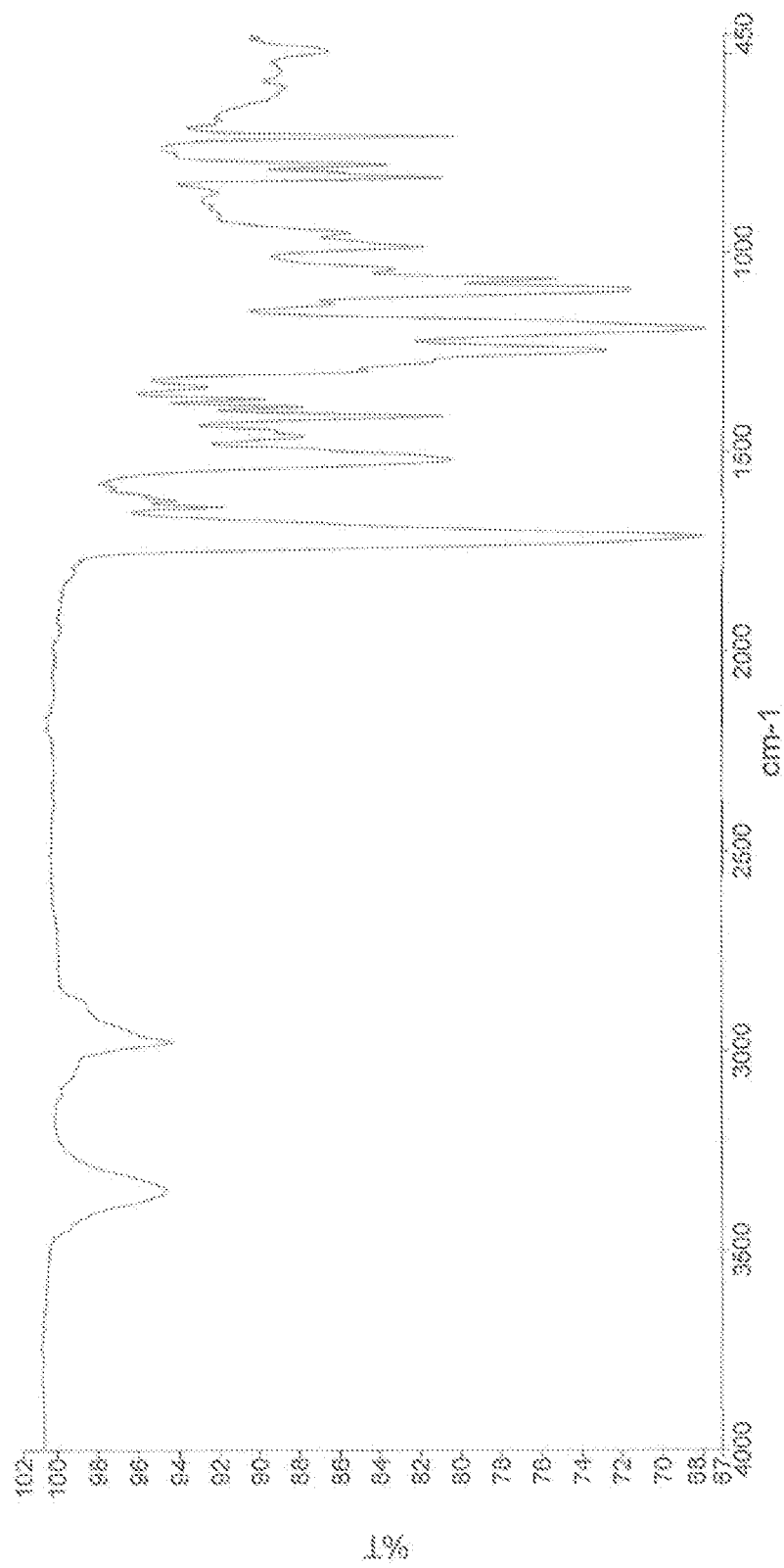
FIG. 9 shows an IR spectrum of a composition containing a thiourethane acrylate (D-27) obtained in Example 27.
Figure 10:
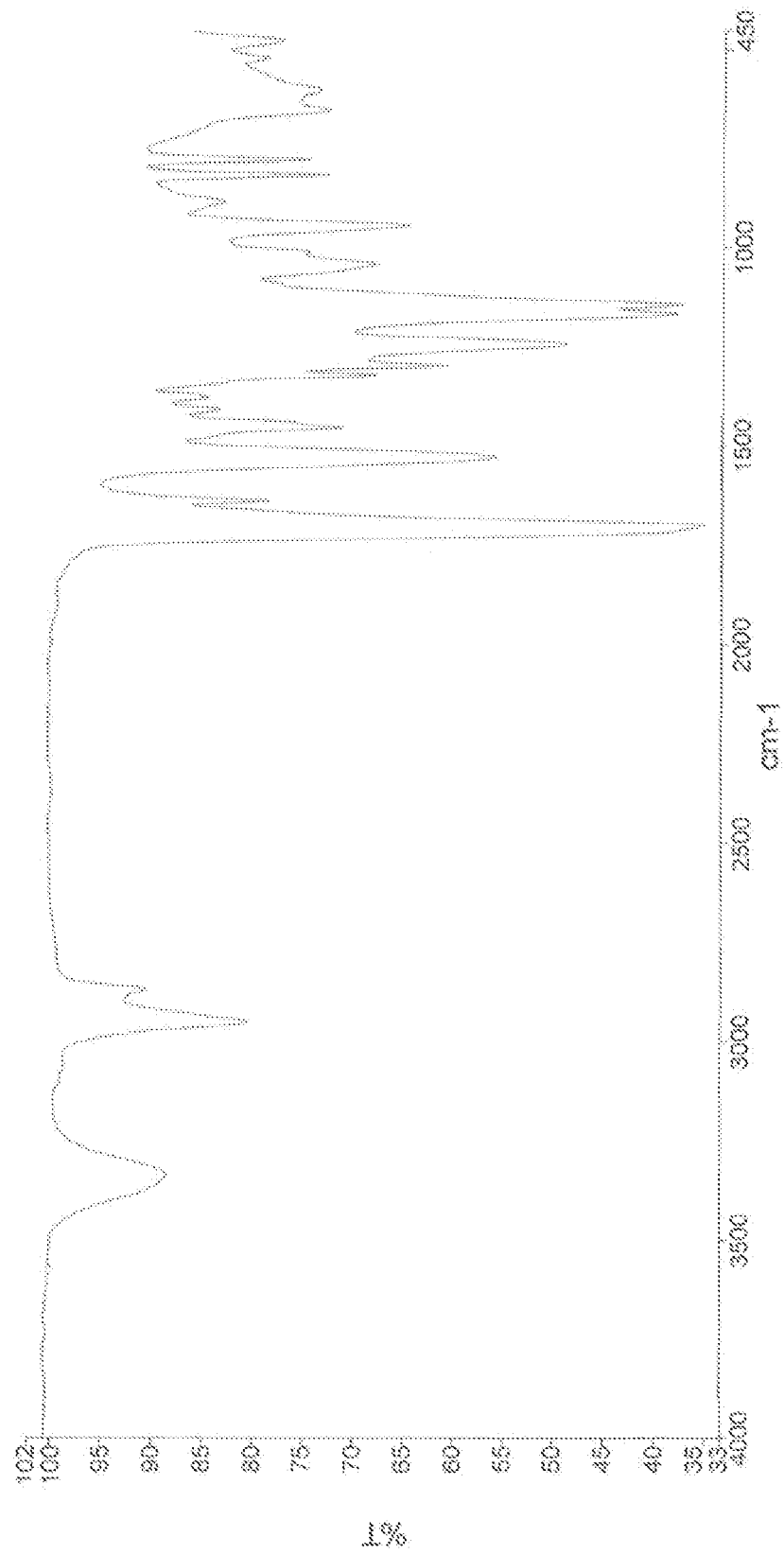
FIG. 10 shows an IR spectrum of a composition containing a thiourethane methacrylate (D-30) obtained in Example 30.
Figure 11:
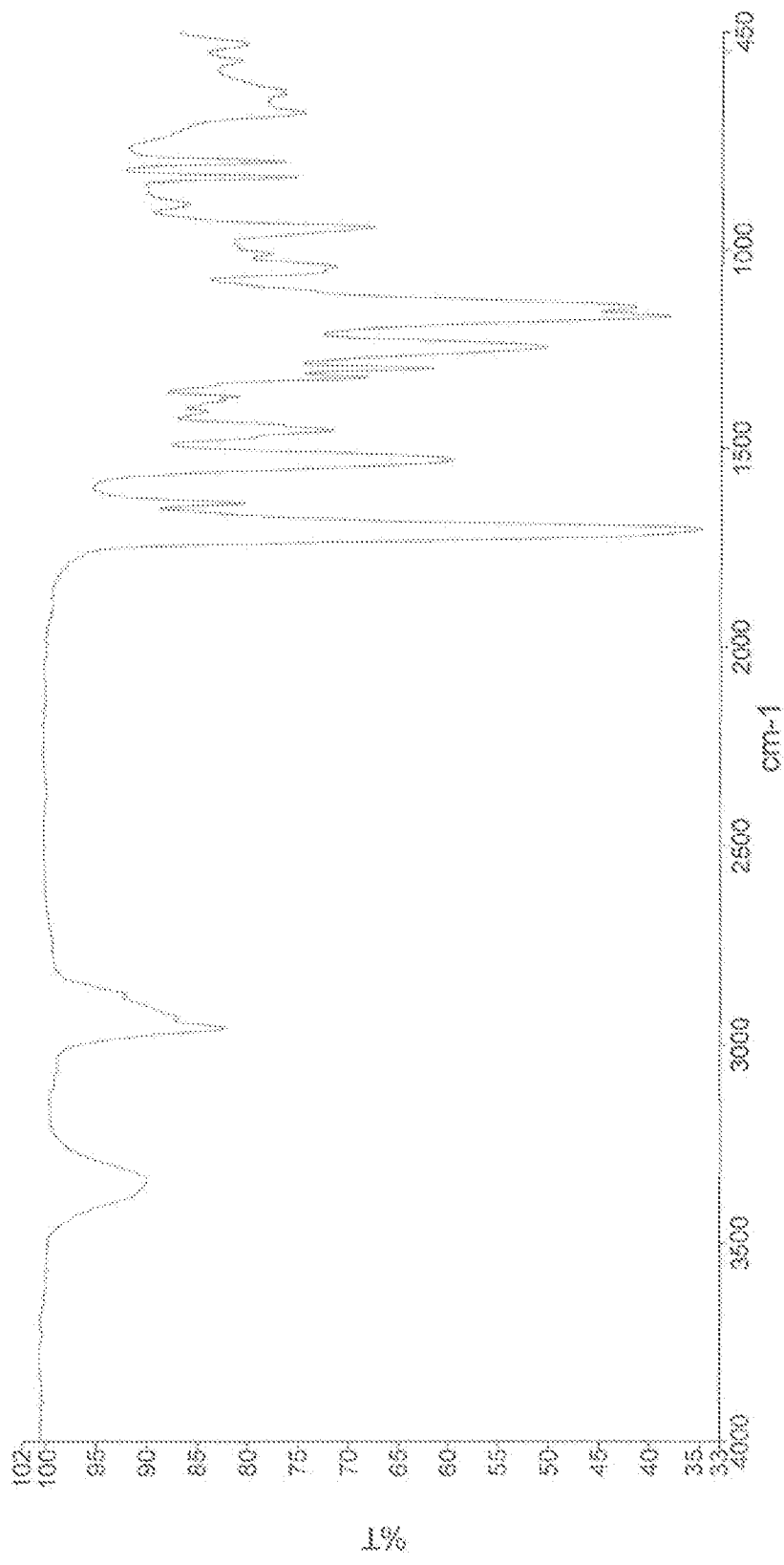
FIG. 11 shows an IR spectrum of a composition containing a thiourethane methacrylate (D-33) obtained in Example 33.

The composition containing the thiourethane (meth)acrylate obtained in each of Examples was allowed to stand at 20° C. for 24 hours, and the infrared resonance spectrum was then measured for the composition containing the thiourethane (meth)acrylate at 20° C. The IR spectrum of the composition containing the (meth)acrylate (D-3), (D-6), (D-9), (D-12), (D-15), (D-18), (D-21), (D-24), (D-27), (D-30), or (D-33) is shown in each of FIGS. 1 to 11.

The invention claimed is:

1. A (meth)acrylate (D) which is a reaction product of:
   a thiol compound (A) having three or four mercapto groups;
   an iso (thio) cyanate compound (B) having two or more iso (thio) cyanato groups; and
   a hydroxy (meth)acrylate compound (C) having one or more polymerizable groups,
   wherein the (meth)acrylate (D) is represented by the following general formula (1):

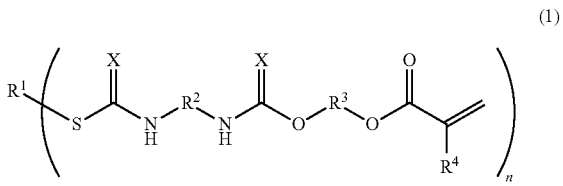

(1)

wherein
   $R^1$ is a residue excluding all mercapto groups from a thiol compound (A1) having three or four mercapto groups;
   $R^1$ is a group represented by the following formula (2), (3), (4-1), (4-2), or (4-3);

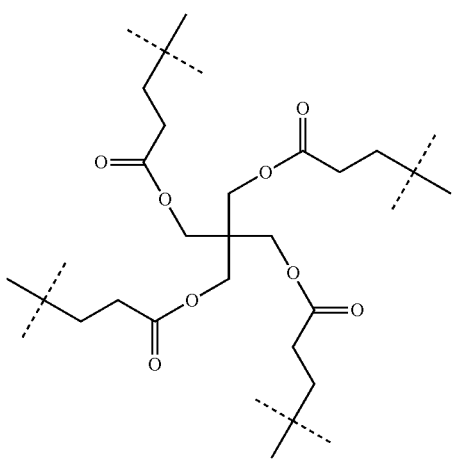
(2)

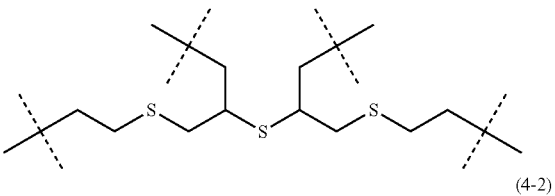
(4-1)

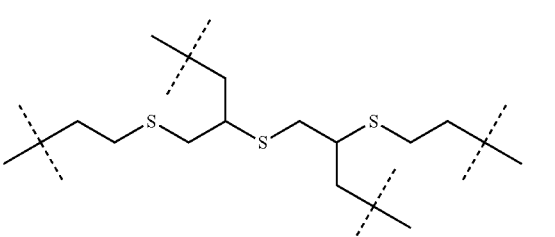
(4-2)

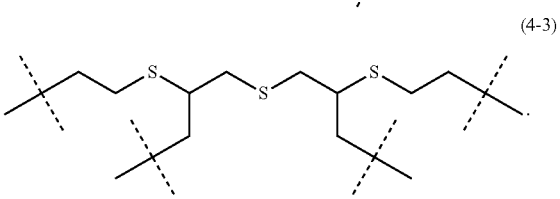
(4-3)

$R^2$ is a group represented by the following formula (5), (6), (7), or (8):

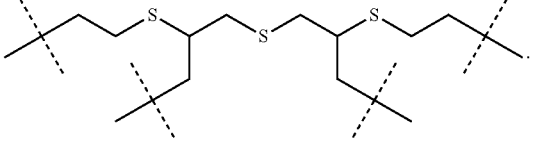
(5)

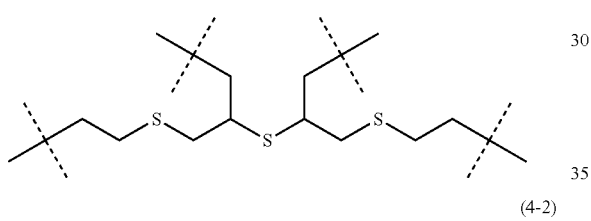
(3)

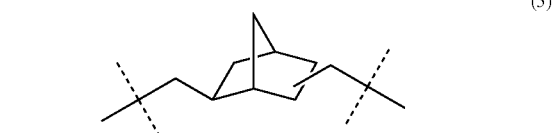
(6)

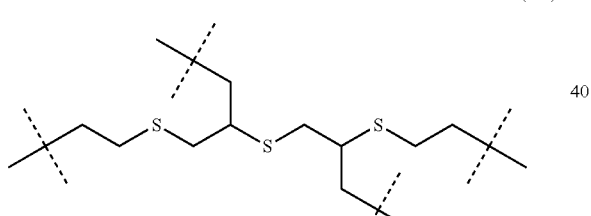
(4-1)

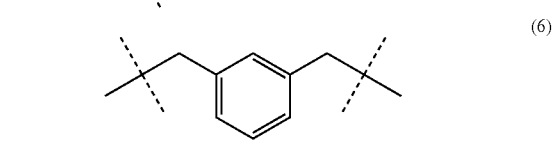
(7)

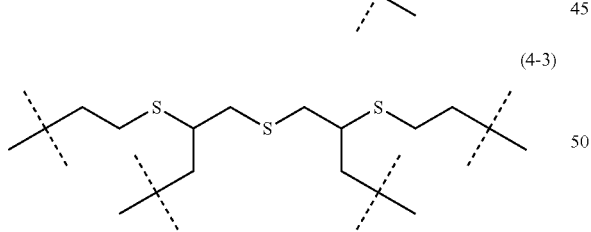
(4-2)

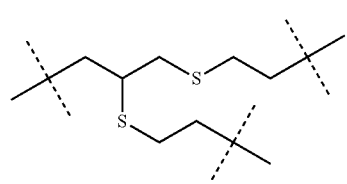
(8)

$R^3$ is a residue excluding one (meth)acryloyloxy group and one hydroxy group from the hydroxy (meth)acrylate compound (C);

$R^4$ represents a hydrogen atom or a methyl group;

X represents an oxygen atom or a sulfur atom;

n represents a number of all the mercapto groups contained in the thiol compound (A1); and a plurality of $R^2$, $R^3$, $R^4$, and X may each be the same as or different from each other.

2. The (meth)acrylate (D) according to claim 1, wherein in the general formula (1), $R^1$ has a molecular weight of 150 to 400.

3. The (meth)acrylate (D) according to claim 1, wherein $R^3$ in the general formula (1) is a $C_{2-6}$ linear alkylene group in which a hydrogen atom may be substituted with a $C_{1-3}$ alkyl group, or a linear oxyalkylene group in which a hydrogen atom may be substituted with a $C_{1-3}$ alkyl group.

4. The (meth)acrylate (D) according to claim 1, wherein the (meth)acrylate (D) has a viscosity of 1 to 50000 mPa·s at 65° C.

5. The (meth)acrylate (D) according to claim 1, wherein in the reaction of the thiol compound (A), the iso (thio) cyanate compound (B), and the hydroxy (meth)acrylate compound (C), a ratio (a/b) of a number of moles of the mercapto groups of the thiol compound (A), a, to a number of moles of the iso (thio) cyanato groups of the iso (thio) cyanate compound (B), b, is 0.01 to 0.20.

6. The (meth)acrylate (D) according to claim 1, wherein the thiol compound (A) is at least one selected from the group consisting of pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

7. The (meth)acrylate (D) according to claim 1, wherein the iso (thio) cyanate compound (B) is at least one selected from the group consisting of 2,2,4-trimethylhexane diisocyanate, 2,4,4-trimethylhexamethylene diisocyanate, m-xylylene diisocyanate, 2,5-bis(isocyanatomethyl) bicyclo-[2.2.1]-heptane, and 2,6-bis(isocyanatomethyl) bicyclo-[2.2.1]-heptane.

8. A monomer composition comprising the (meth)acrylate (D) according to claim 1.

9. The monomer composition according to claim 8, wherein the monomer composition is a dental material monomer composition.

10. The monomer composition according to claim 8, wherein the monomer composition contains a polymerizable compound (E) containing at least one polymerizable group selected from a methacryloyl group and an acryloyl group, excluding a (meth)acrylate (D).

11. A dental material composition comprising:
the monomer composition according to claim 8;
a polymerization initiator; and
a filler.

12. The (meth)acrylate (D) according to claim 1, wherein $R^1$ is a group represented by the formula (3), (4-1), (4-2), or (4-3).

* * * * *